(12) United States Patent
Li et al.

(10) Patent No.: US 12,037,258 B2
(45) Date of Patent: Jul. 16, 2024

(54) PROCESS FOR RAPIDLY MANUFACTURING ULTRASMALL PHASE-CHANGE VO2 NANOMATERIAL

(71) Applicant: UCHICAGO ARGONNE, LLC, Chicago, IL (US)

(72) Inventors: Jie Li, Darien, IL (US); Mai Kim Tran, Orlando, FL (US); Ralph T. Muehleisen, Oak Park, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 330 days.

(21) Appl. No.: 17/165,587

(22) Filed: Feb. 2, 2021

(65) Prior Publication Data
US 2022/0242744 A1 Aug. 4, 2022

(51) Int. Cl.
*C01G 31/02* (2006.01)
*B82Y 30/00* (2011.01)
*B82Y 40/00* (2011.01)

(52) U.S. Cl.
CPC ..... *C01G 31/02* (2013.01); *B01J 2219/00033* (2013.01); *B01J 2219/00051* (2013.01);
(Continued)

(58) Field of Classification Search
CPC ... C01G 31/02; B01J 19/0013; B01J 19/0093; B01J 2219/0033; B01J 2219/0051;
(Continued)

(56) References Cited

U.S. PATENT DOCUMENTS 8,553,333 B2 10/2013 Chang et al.
8,801,979 B2 8/2014 Chang et al.
(Continued)

OTHER PUBLICATIONS

Xu, Yu. "Continuous hydrothermal flow synthesis of functional oxide nanomaterials used in energy conversion devices." Department of Energy Conversion and Storage, Technical University of Denmark 236p (2017).*
(Continued)

*Primary Examiner* — Richard M Rump
(74) *Attorney, Agent, or Firm* — CHERSKOV FLAYNIK & GURDA, LLC

(57) ABSTRACT

The invention provides a method for continuously producing composite nanoparticles, the method comprising heating a precursor mixture with supercritical water, wherein the mixture contains a first compound capable of transitioning from a monoclinic to a tetragonal rutile crystal state; cooling the heated mixture to obtain core particles of a predetermined shape and size; encapsulating the core particle with a second precursor to create a core-shell construct; and encapsulating the construct with an organic material. Also provided is a device for continuously synthesizing composite nanoparticles, the device comprising a water supply and a precursor supply; a means for heating the water, a continuous flow hydrothermal reaction chamber adapted to receive the heated water and precursor, a means for chilling the heated water and precursor, and a capping agent supply positioned downstream of the reaction chamber. The invention also provides a nanocomposite particle comprising a core region, and a conformal organic overcoat.

15 Claims, 17 Drawing Sheets

(52) U.S. Cl.
CPC ............... *B01J 2219/00162* (2013.01); *B01J 2219/00166* (2013.01); *B82Y 30/00* (2013.01); *B82Y 40/00* (2013.01); *C01P 2002/52* (2013.01); *C01P 2004/64* (2013.01)

(58) Field of Classification Search
CPC .. B01J 2219/00162; B01J 2219/00166; B82Y 30/00; B82Y 40/00; C01P 2004/64
See application file for complete search history.

(56) References Cited

U.S. PATENT DOCUMENTS

| | | | |
|---|---|---|---|
| 9,975,804 B2 | 5/2018 | Li et al. | |
| 2012/0298037 A1 | 11/2012 | Paul et al. | |
| 2013/0101848 A1 | 4/2013 | Banerjee et al. | |
| 2015/0367318 A1* | 12/2015 | Lester | B01J 19/006 422/162 |
| 2016/0074823 A1* | 3/2016 | Darr | B01J 3/008 422/162 |
| 2017/0297949 A1* | 10/2017 | Li | C03B 37/0753 |

OTHER PUBLICATIONS

Nadimicherla, Reddeppa, et al. "Effect of polyethylene glycol on vanadium oxide nanotubes in lithium-ion batteries." Microelectronic engineering 127 (2014): 81-85.*

Liang, Shan, et al. "One-step hydrothermal synthesis of W-doped VO2 (M) nanorods with a tunable phase-transition temperature for infrared smart windows." ACS omega 1.6 (2016): 1139-1148.*

Tran, Mai Kim. Sustainable Manufacturing: Greener Materials and Methods for Li-ion Battery Recycling, Supercapacitors, and Smart Windows. Diss. Rice University, 2020.*

Malarde, Delphine, et al. "Direct and continuous hydrothermal flow synthesis of thermochromic phase pure monoclinic VO 2 nanoparticles." Journal of Materials Chemistry C 6.43 (2018): 11731-11739.*

Janamphansang, Lalipat, Jatuphorn Wootthikanokkhan, and Saiwan Nawalertpanya. "Preparation of VO 2 Nanoparticles with Surface Functionalization for Thermochromic Application." Engineering Journal 23.5 (2019): 205-215.*

Cai, et al. "Design of nozzle structure for SEDS technology to prepare sub-micron RDX particles." Chinese Journal of Energetic Materials 24.7 (2016): 678-685.*

Zomaya, Dicho. Synthesis of Chemically Stable VO2 Particles Using Green Solvents and their Application as Smart Coatings. Diss. The University of Western Ontario (Canada), 2019.*

Zhang Chen, et al., "Fine crystalline Vo2 nanoparticles: synthesis, abnormal phase transition temperatures and excellent optical properties of a derived VO2 nanocomposite foil," Journal of Material Chemistry A, 2014, 2, pp. 2718-2727.

Shu-Yi Li, et. al., "Thermochromic undoped and Mg-doped Vo2 thin files and nano-particles: Optical properties and performance limits for energy efficient windows," Journal of Applied Physics, 115. (2014), pp. 053513-1-053513-10.

Kari Thorkelsson, et al., "Direct Nanorod Assembly Using Block Copolymer-Based Supermolecules," Nano Letters, 2012, 12, pp. 498-504.

Yongxing Hu, et al., "A Generic Approach for the Synthesis of Dimer Nanoclusers and Asymmetric Nanoassemblies," Journal of the American Chemical Associates, Jan. 24, 2013, pp. 2213-2221, S1-S10.

Werner Stobber, et al., "Controlled growth of nanodisperse silica spheres in the micron size range," Journal of the Colloid and Interface Science, vol. 26, Issue 1, Jan. 1968, pp. 62-69.

Adrian M. Nightingale, et al., "Microscale Synthesis of Quantum Dots," Journal of Materials Chemistry, vol. 20, 2010, pp. 8454-8463.

Steven M. George, et al., Atomic Layer Deposition—An Overview, Chem Rev. 110—(2010) 111.

Delphine Longrie, et al., "Reactor concepts for atomic layer deposition on agitated particles: A Review," Journal Vac. Sci. Technology A 32 (2014) 010802).

Shi-Di Lan, et al., "Heteroepitaxial TiO2(@W-doped VO2 Core/shell nanocrystal films: preparation, characterization, and application as bifunctional window coatings," RSC Adv., 2015, 5, p. 73742.

Shaotang Li, et al., "Preparation and Characterization of Self-Supporting Thermochromic Films, Composed of VO22 (M) @ SiO2 Nanofibers," ACS Applied Materials & Interfaces, 2013 American Chemical Society, pp. 6453-6457.

* cited by examiner

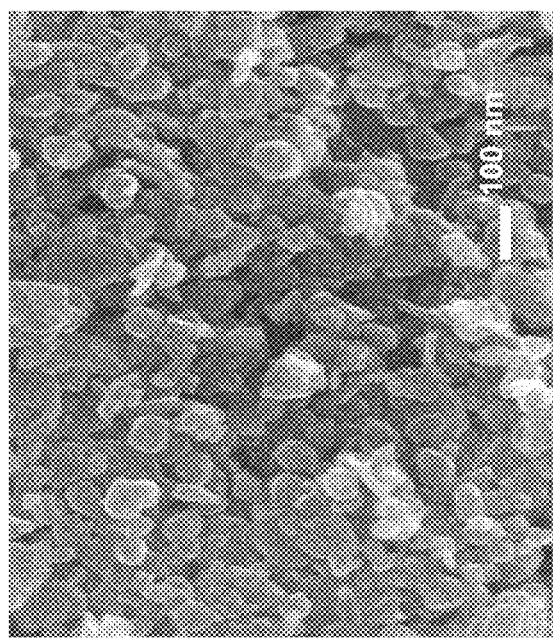
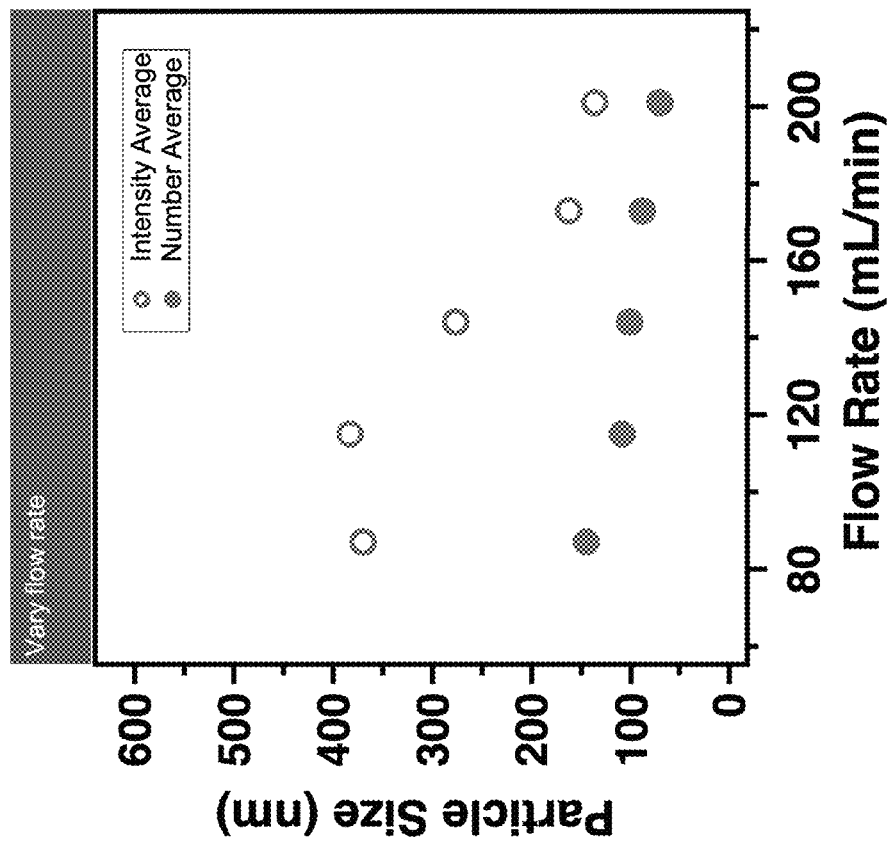
FIG. 3A

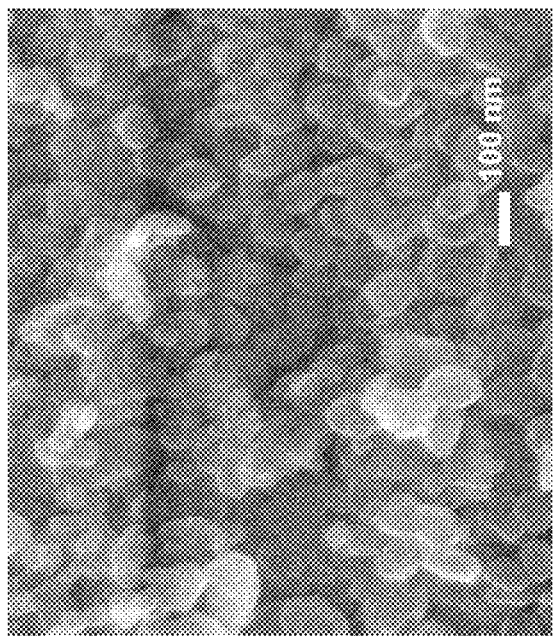
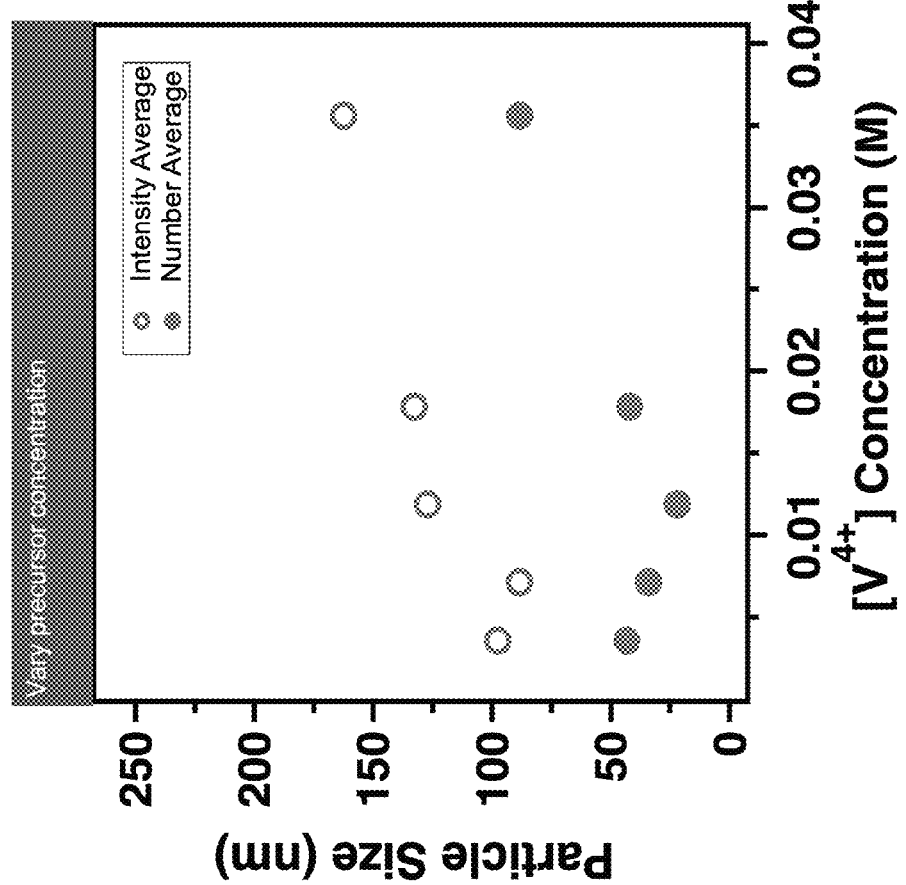
FIG. 3B

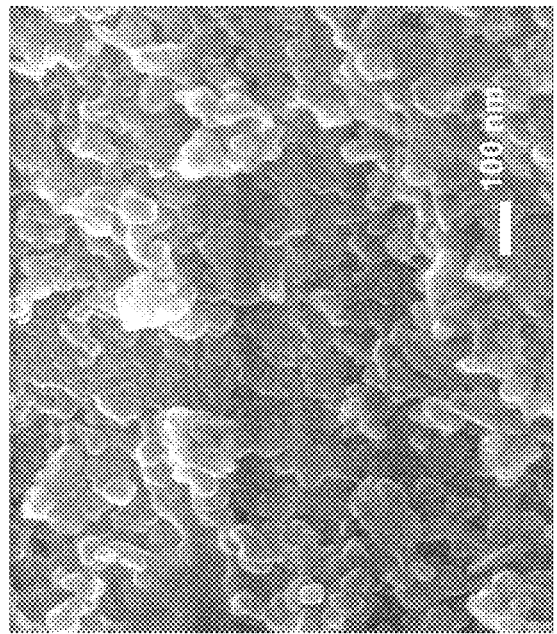
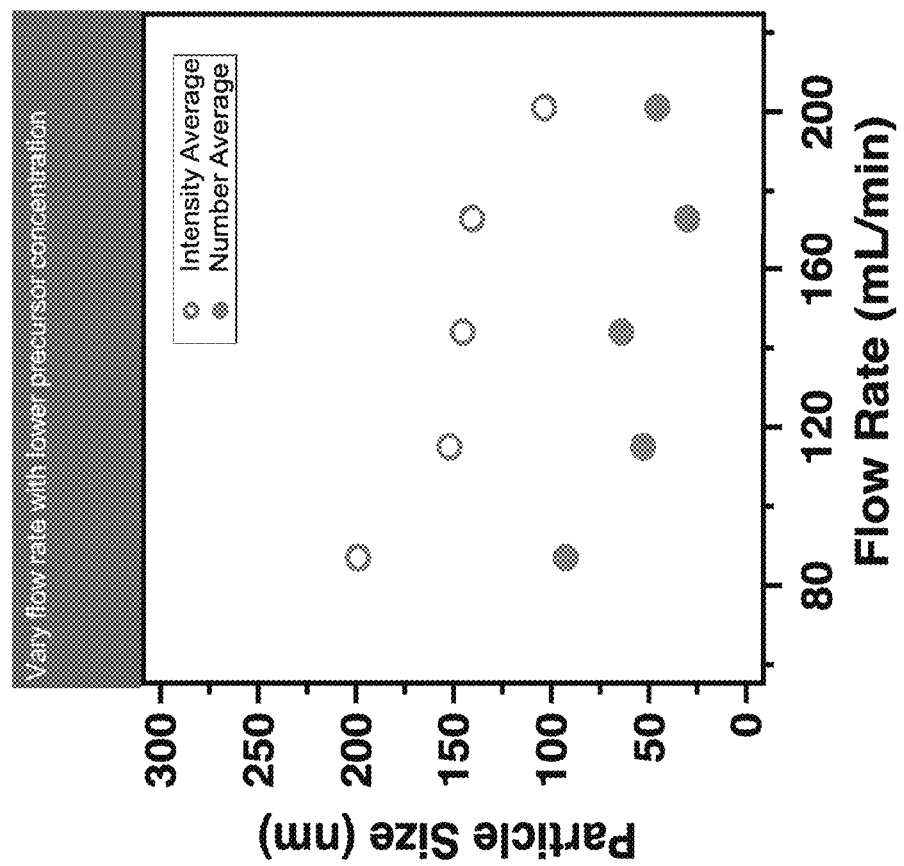
FIG. 3C

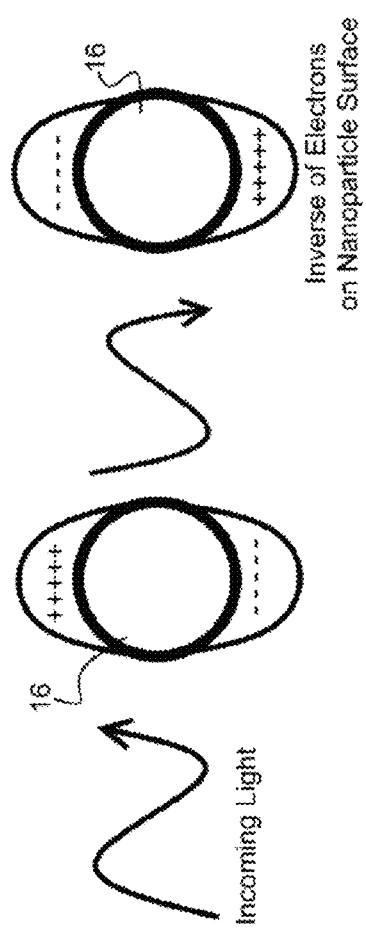

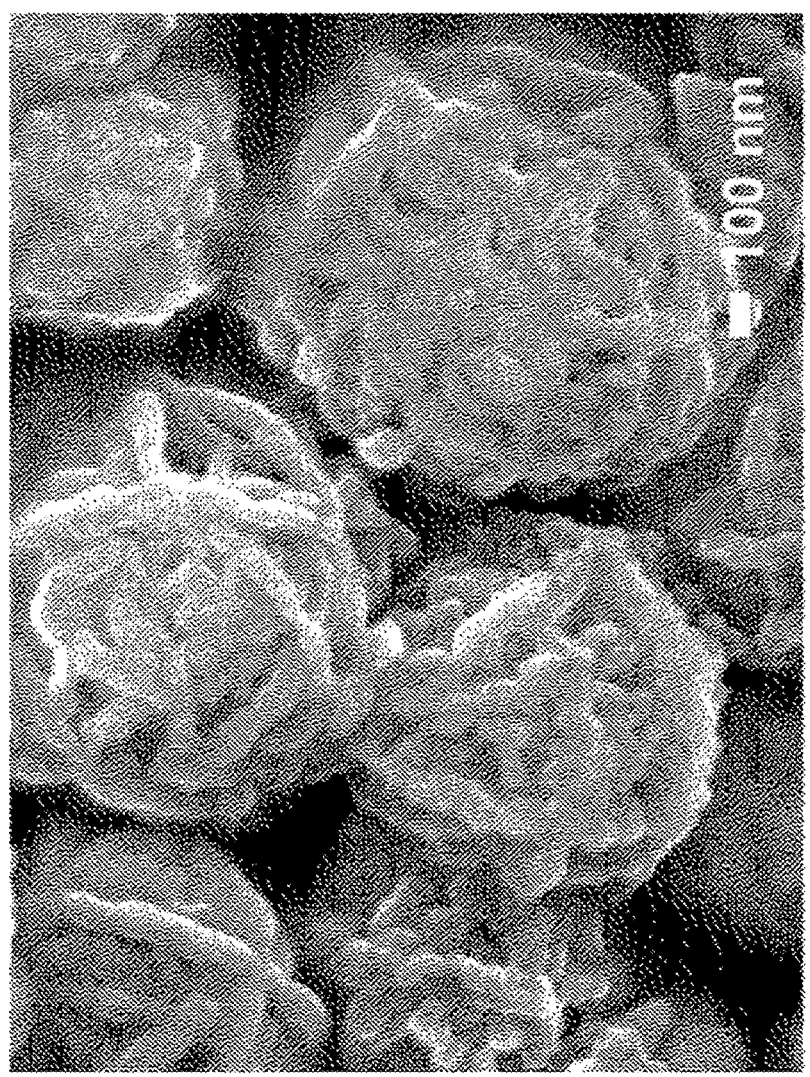
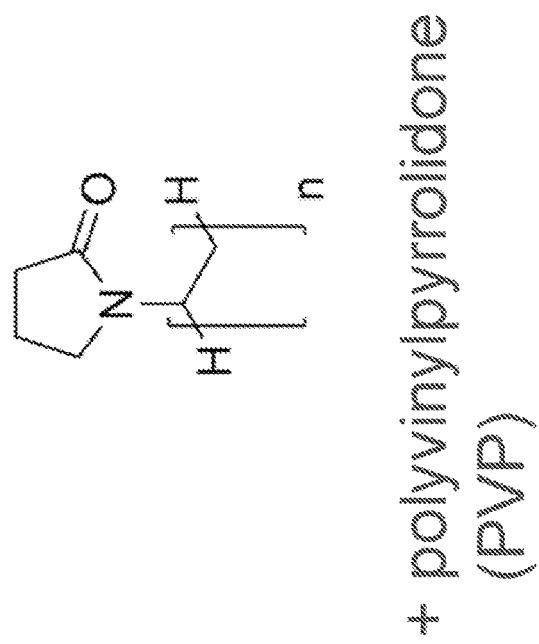
Fig. 7A

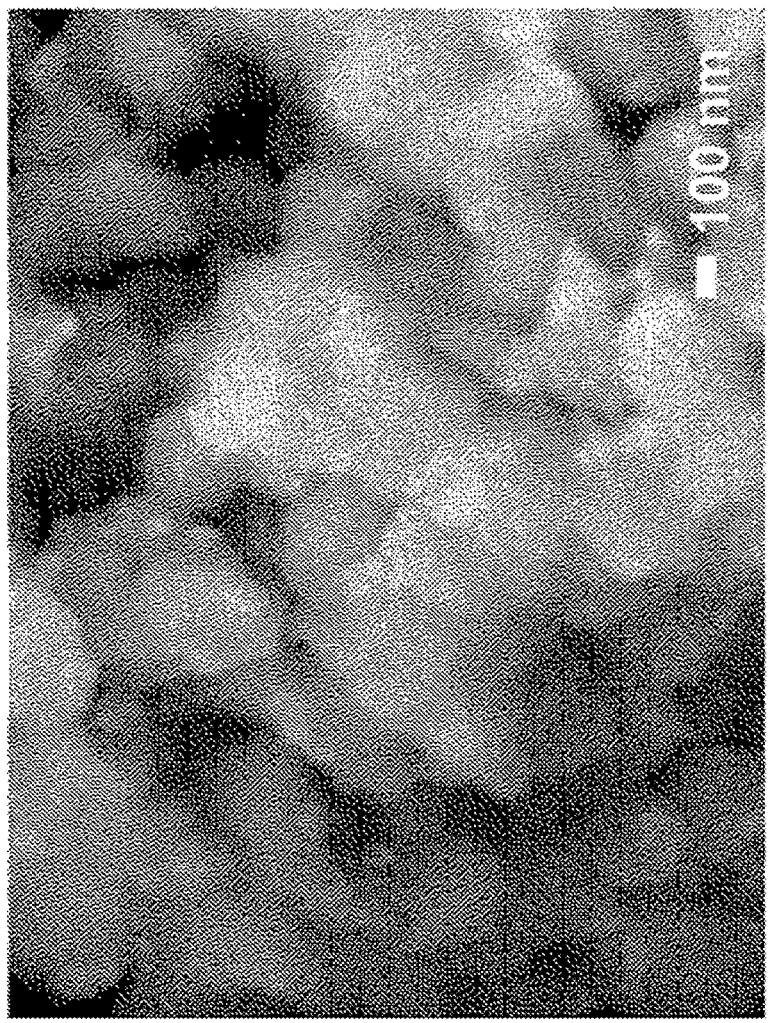
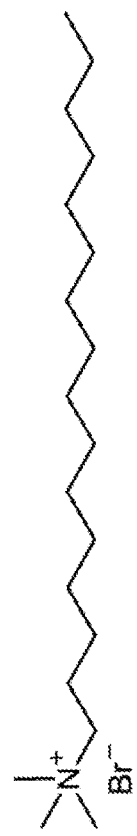
Fig. 7B

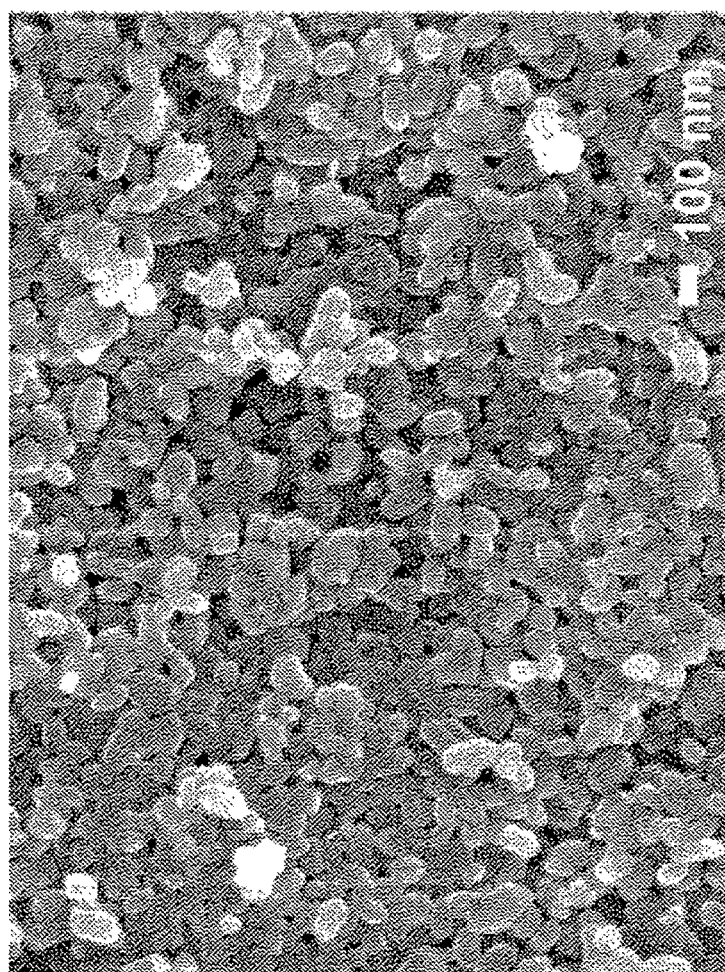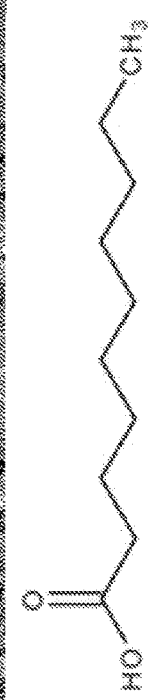
Fig. 7C

PROCESS FOR RAPIDLY MANUFACTURING ULTRASMALL PHASE-CHANGE VO2 NANOMATERIAL

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

BACKGROUND OF THE INVENTION

1. Field of the Invention

This invention relates to inorganic nanoparticles and more specifically, this invention provides a nanoparticle composite and method for making a nanoparticle composite.

2. Background of the Invention

Inorganic nanoparticles hold promise for a myriad of applications, including thermochromics, drug delivery, communication technology, and energy conversion. However, adoption of these materials remains tepid due to a lack of efficient manufacturing processes for making same.

Existing batch processes for the manufacturing of large-volume nanoparticles (i.e., between 20 nm and 30 nm in diameter) are time consuming (often taking days) and result in poor material quality control. These processes are associated with potential explosion hazards and high product costs.

For example, for applications in the dynamic window film market, the fabrication of electrochromic windows is expensive. Their overlaying film comprises several layers of materials and are based on a principle similar to metal-ion batteries. Methods of fabrication for high performance nanocomposite thermochromic dynamic windows which incorporate nanoparticles typically require harsh reaction conditions. As noted supra, fabrication is in batch mode, thereby resulting in inconsistent quality between batches. Separately, autoclave temperatures of between 220 and 400° C. are typically required, as are pressures in excess of 20 bars. Fabrication times are lengthy, at more than 24 hours, and typically 1 to 7 days.

State of the art nanoparticle fabrication protocols embody limited controllability for synthetic conditions, such as mixing, heat and mass transfer. Reactor explosion hazards are also present. Also, batch systems are poorly scalable, and require large footprints. Resulting product is expensive.

Due to the challenge with working with multivalent vanadium which exhibits various stable oxidation states ($V^{2+}$, $V^{3+}$, $V^{4+}$, $V^{5+}$) in addition to its many polymorphs (B-, A-, M-, D-, and P-phase), the processing techniques are simply too complicated, requiring multiple steps that also consume time and energy.

Traditionally, to create $VO_2$ (M) nanoparticles, a hydrothermal batch-method using an autoclave is often used, and the reaction of the reactants and additives can take extended periods of time from hours to even days, yielding nanoparticles in various shapes and sizes from rods, nanowires, and nano-belts to snowflakes and spheres that have to undergo an additional annealing step to convert fully from B-phase to A-phase, and then finally M-phase.

Continuous flow hydrothermal (CFHT) systems have been attempted to synthesize nanoparticles in recent years. They operate at approximately, or higher than, the supercritical temperature and pressure (i.e. 350° C.; 170 bar) of water. Particle synthesis is carried out via a transient contact mode of reactants with vessel walls, conduits or other physical surfaces. The resident time of reactants within such reactors is measured in minutes, up to about an hour, often due to post annealing steps. This is still too long since it results in the generation of large size (e.g., above 150 nm in diameter) nanoparticles per agglomeration mechanism.

In addition, some CFHT processes are not successful in directly obtaining M-phase $VO_2$ in a single step. Also, the final product is featured with agglomerate large nanoparticles too, primarily due to post annealing steps.

Furthermore, flow rates of these ultrafast systems are less typically than 20 ml per minute.

Generally, in state of the art continuous flow systems, size, morphology, and phase structure of the $VO_2$ particles have not been well controlled. This is largely caused by limited mixing between the heating fluid and the reactant stream. This results in not obtaining the right phase (M-phase), or the generation of larger than desired particles.

A need exists in the art for a one step method for producing uniform nanoparticles comprising transition metals. The method should produce nano-particles between 3 nm and 50 nm in diameter and preferably no more than 40 nm in diameter. The particles should be uniform such as to have size variations of no more than 5 nm. The particles should be generated within minutes in a continuous economical manufacturing process to facilitate their use in thermochromic windows, drug delivery, communication technology, and energy conversion.

SUMMARY OF INVENTION

An object of the invention is to provide thermochromic substrates and methods for producing thermochromic substrates that overcome many of the disadvantages of the prior art.

Another object of the invention is to provide a continuous (i.e., not batch) method for producing transition metal oxides, A feature of the invented method is that it can generate ultra small particles (less than 50 nm) within a tight size distribution range not exceeding 5 nm. An advantage of the method is that both the creation of ultra-small nanoparticles and the deposition of an organic thin coating over the particle can be performed in one step.

Another object of the invention is to provide a method for making thermochromic window films. A feature of the invention is rapid heating of precursor mixtures in a continuous flow hydrothermal (CFHT) process. An advantage of this feature is that it generates ultra-small (between 3 and 40 nm) particles which serve as uniform $VO_2$ nucleation cores. (The inventors found that nanoparticle radii less than about 40 nm and preferably less than about 20 nm avoid pronounced light scattering.

Still another object of the present invention is to provide a method for generating thermochromic substrates which optimizes the production of preferred $VO_2$ phases. A feature of the method is utilization of a second heating step during particle growth. An advantage of the invention is that any non-M-phase $VO_2$ particles (e.g., A- or B-phase $VO_2$) are converted to the required M-phase $VO_2$ particles.

Yet another object of the present invention is to provide a continuous method for producing functionalized $VO_2$ particles. A feature of the invention is dissolving organic material in super critical fluid entraining the particles. An advantage of this process is that it coats the particles and facilitates product-water separation. This reduces product cost, and is further reduced if artificial intelligence is utilized in the mixing and separating process.

Another object of the present invention is to provide a method for generating particular size nanoparticles for use in thermochromic applications. A feature of the invented method is the use of confined jets or a heated fluid distributor. In the invented system, supercritical fluid such as water readily provides enough heating energy. Heating speed is largely determined by how well/quick super critical water can be mixed into a cold precursor stream. An advantage of the method is that smaller nanoparticles are generated compared to state of the art counter-current flow paradigms.

Still another object of the present invention is to provide a method to obtain pure M-$VO_2$. A feature of the invention is maintaining a uniform high temperature field. One means for doing this is by operating inside a heated furnace to prevent the formation of local cold spots near the reaction wall regions in reaction environments. An advantage of the invention is the prevention of the formation of B or A-phase $VO_2$.

Another object of the present invention is to provide a pure M-phase $VO_2$ nanoparticle and a method for producing such a purified nanoparticle. A feature of the invention comprises hydrothermically heating a suspension containing V4+ precursor to between about 300° C. and about 500° C. to provide a uniform temperature field. In an embodiment of the invention, heating with primary supercritical water occurs in the center of the reactor, thereby virtually eliminating contact of nanoparticles produced with the walls of the reactor. The inventors estimate that between 0 and 5 percent of the nanoparticles produced contact the reactor walls, often between 2 and 5 percent and usually no more than 2 percent. An advantage of the invention is that the purification process prevents the generation of low-temperature phases (i.e. A or B phase $VO_2$) or mixed phase $VO_2$ nanoparticle materials.

Briefly, the invention provides a method for continuously producing nanoparticles, the method comprising: heating a precursor mixture with supercritical fluid (such as water), wherein the mixture contains a first compound capable of being nucleated into nanoparticles which can be a tetragonal rutile crystal state, or may transition from a monoclinic to a tetragonal rutile crystal state; tuning flowrate of heating fluid and thus particle residence time to control particle growth and size; cooling the heated mixture to stop the particle growth and obtain core particles of a predetermined shape and size; and encapsulating the core particles with an organic material.

Also provided is a device for continuously synthesizing composite nanoparticles, the device comprising a fluid supply and a precursor supply; a means for heating the fluid, a continuous flow hydrothermal reaction chamber adapted to receive the heated water and precursor, a means for chilling the heated water and precursor, and a capping agent supply positioned downstream of the reaction chamber.

The invention also provides a nanocomposite particle comprising a core region, and a conformal or non-conformal organic overcoat. For example, conformal films may be applicable for smart film applications so as to control light flow around particles. Conformal coatings may not be necessary for extremely small particles (e.g., less than 20 nm) which have negligible effect on light scattering.

BRIEF DESCRIPTION OF DRAWING

The invention together with the above and other objects and advantages will be best understood from the following detailed description of the preferred embodiment of the invention shown in the accompanying drawings, wherein:

FIG. 3A is a graph and associated solar energy modulation (SEM) image showing particle size changes with flow rates, in accordance with features of the present invention;

FIG. 3B is a graph and associated SEM image showing particle sizes given various precursor concentrations;

FIG. 3C is a graph and associated SEM image showing particle sizes at various precursor low rates and relatively low precursor concentrations;

FIG. 5 is a depiction of the surface plasmon resonance affected by the invented particles, in accordance with features of the present invention.

FIG. 7A shows particles coated in polyvinylpyrrolidone (PVP);

FIG. 7B shows a particle coated in cetrimonium bromide (CTAB);

FIG. 7C depicts particles coated with decanoic acid;

DETAILED DESCRIPTION OF THE INVENTION

Figure 1:
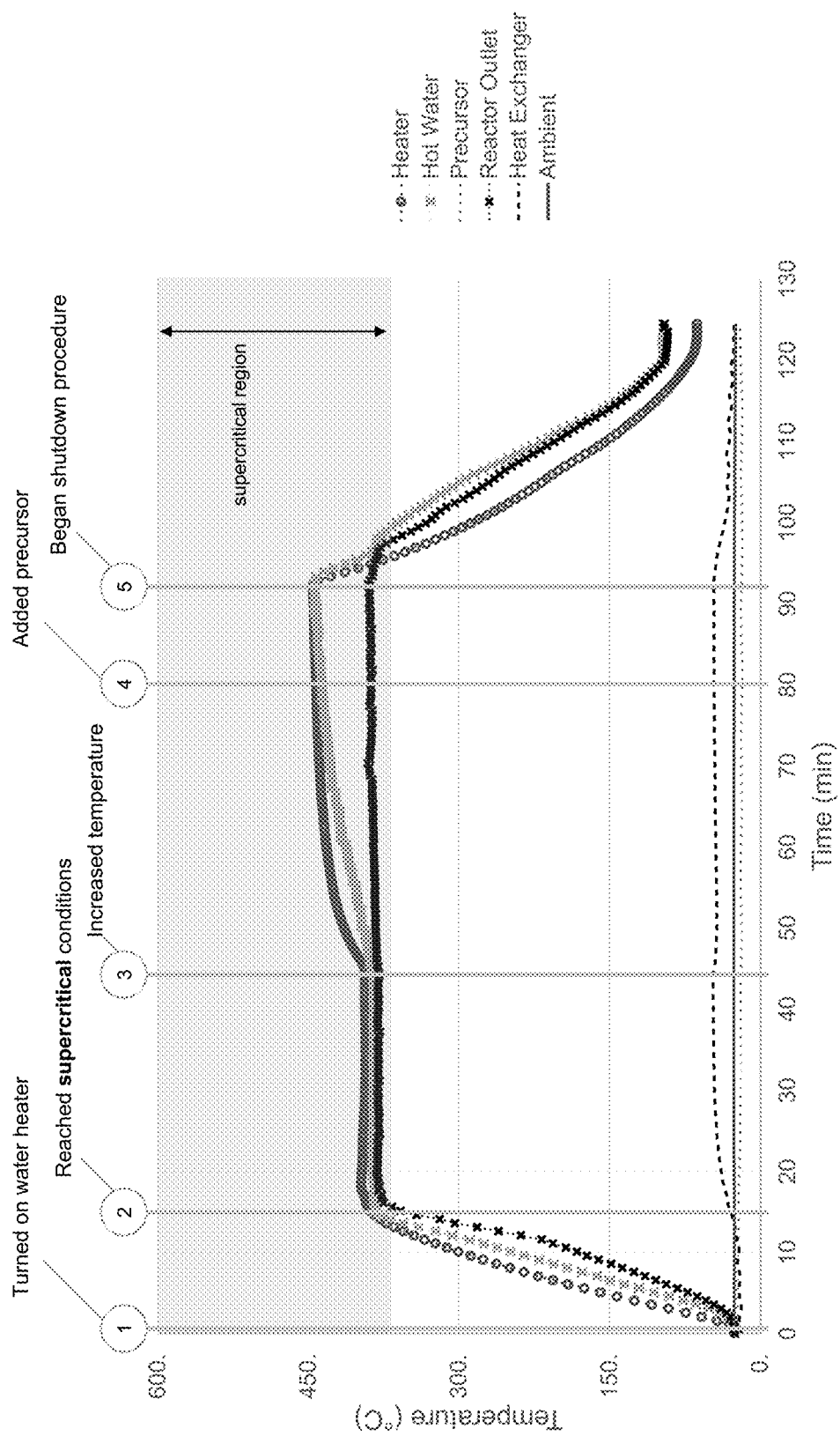
FIG. 1 is an example of the temperature time line of the invented method, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Ultra-small nanoparticles, <100 nm, ideally <50 nm, are provided for a myriad of applications; for example to make high-quality composite window film since a clear film can be obtained and light scatter can be effectively suppressed by using ultrasmall $VO_2$ nanoparticles. Other transition metals that exhibit the metal-to-insulator transitions or ligand exchange mechanisms such as the oxides of Fe(II), Co(II), Ni(II) or Cu(II) are also generated and applicable to such technologies as drug delivery, communications, and energy conversion. Specifically compounds such as $Ag_2O$, $MnO_2$, CuO and particularly FeO are usable for drug delivery. Communication technology and energy conversion encompass a large variety of metals and alloys like NiPt, often accompanied by $TiO_2$, $SiO_2$, or ZnO. Electrode materials and catalysts which can be synthesized by the invented process include $SrTiO_3$, $LiFePO_4$, and $LiCO_2$.

Transition metal oxides have unique metal-to-insulator transition characteristics making them particularly interesting materials for both fundamental research as well as test subjects for a number of applications.

Nanoparticle synthesis using continuous a flow hydrothermal (CFHT) system (FIG. 2) is provided to produce particles 16 (see schematic FIG. 5 and SEM photographs depicted in FIG. 7) having a core of transition metal and an organic coating. FIGS. 5 and 7 are further described infra. The particles may be used for various industries from catalysis, optics, and electronics, to energy storage and even healthcare.

Thermochromic windows is one such application. Two forms of transmittance are involved: solar (i.e. heat) transmittance and luminous (i.e., visible light) transmittance. Vanadium (IV) oxide ($VO_2$) for example, has garnered attention for its use in energy-efficient thermochromic smart window films and building materials. Its reversible transformation from an insulating monoclinic M-phase to a metallic rutile R-phase above a critical transition temperature make it an ideal window film material that can passively allow in or reflect certain wavelengths of light. This structural reversibility can be used to let in near-infrared (NIR) wavelengths felt as heat during cold, winter months as $VO_2$ (M) is present, and block thus NIR heat during hot, summer months as $VO_2$ (R) is present.

The rutile metal-state at 2 eV, has negligible band gap compared to monoclinic crystals. As such, and as discussed infra related to FIG. 5, during winter weather, monoclinic crystal structures allow solar heat to pass, while during summer weather the crystal, now transformed to the rutile configuration, reflects incoming long wavelength light.

The instant CFHT system utilizes supercritical fluid (for example water maintained at temperatures >374° C. and pressures >22 MPa) which allows optimum supersaturation to occur, thereby maximizing nucleation rates by more than $10^3$, while lowering viscosity, density, and the dielectric constant dramatically. This reaction environment makes normally formerly soluble polar inorganic salts insoluble due to the highly hydrolyzing environment. Higher rates of precipitation in the supercritical state results, rates not seen in otherwise ambient conditions.

Generally, the supercritical fluid may be a compound genus selected from the group consisting of oxidized carbons (e.g., $CO_2$), alcohols, alkanes, aromatics and combinations thereof. Suitable alcohols include C1-C5 compounds, specifically methanol, ethanol, propanol, butanol, pentanol, and hexanol. Suitable alkanes include hexane. Suitable aromatics include toluene. Water is also a suitable fluid. Using water as a solvent not only provides cost-savings in the long run, but it is a much safer material to work with than using other highly acidic or highly alkaline media in some batch syntheses.

The invention provides continuous flow hydrothermal synthesis with supercritical water to manufacture ultra-small, uniform transition metal (e.g., $VO_2$ (M)) nanoparticles in a scalable process for widespread applications.

FIG. 1 is a temperature time line of the invented method. Numeral 1 at the top of the graph is the point (time=0) where the water heater is turned on. Numeral 2 designates the point where the system reaches supercritical conditions. Numeral 3 designates the point where precursor is added. Numeral 4 designates the point where shutdown is begun. The grey area indicates that the system operates under supercritical region. The temperature time lines of various locations, including the water heater, hot water inlet, precursor inlet, reactor outlet, heat exchanger, as well as ambient, are recorded as shown in the figure. The outlet temperature is monitored to confirm that the system is being continuously operated under supercritical state.

FIG. 1 shows that supercritical temperature is reached in less than 20 minutes. Precursors are added after about an hour after that, or at about 80 minutes after system startup. In the invented system, supercritical water readily provides enough heating energy, and heating speed is largely determined by how well/quick supercritical water can be mixed into the cold precursor supply stream.

Reaction time lasts for about 15-16 minutes after which heat application ceases. In an embodiment of the system, the precursor heating source is primarily the supercritical water. Heated secondary reactor walls surrounding the water eliminate cold spots which would otherwise form due to a single wall's external surfaces contacting ambient atmosphere. This feature results in the formation of a highly uniform flow field. This uniform (i.e., high temperature) field enables the system to generate pure M-phase target $VO_2$ particles and further eliminates any mixed phases which decreases the sought after desired thermochromic effect.

After approximately 30 minutes, the temperature of the system and of the formed product is at ambient temperature, such as room temperature. It is the aforementioned rapid cool down that facilitates the formation and maintenance of particles less than 20 nm in diameter. The rapid cool down process is based on two facets (besides the use of turbulent convective flow enhanced heat): The first is called the "Mpemba effect" wherein the cooling is exponentially faster when the system cooling starts at a high-enough temperature. The second is that thermal conductivity of water is not constant, but changes with temperature with a peak value located around 130° C. This peak value is largely due to the number of hydrogen bonds available in aqueous systems.

Generally, there is a small stream of room temp water that is introduced right after the reaction zone in the supercritical water stream itself. A predominant cooling mechanism comes from the tube-in-tube heat exchanger portals which do not directly contact the nanoparticles.

A salient feature of the system is the utilization of a heat exchanger to facilitate rapid cool down. Heat transfer fluid within the heat exchanger may be water, phase change material, ethanol glycol, propylene glycol, and combinations thereof.

In summary, the cooling step occurs within 1 minutes, preferably within 30 seconds, most preferably within 10 seconds to bring the particles to a low temperature. Low temperature is less than 200° (and preferably between 100° C. and 150° C.), at which both hydrothermal reaction and particle agglomeration can be significantly suppressed. $VO_2$ synthesis occurs from ~180° C. (typically B-phase), then $VO_2$ (A phase) ~240° C., and M-phase around 290° C. Anything below 200° C. results in a system quench. The cooling process can include direct contact with cold water, rapid quenching based on the aforementioned Mpemba principle, and as discussed supra, the variation of water thermal-conductivity with temperature. Thermal conductivity of water varies with temperature with the maximum value located in the regime from 100° C.~150° C. (peak around 130° C.). As such, in an embodiment of the invention, quenching water is mixed with effluent to bring down colloidal temperature to about 130° C. (rather than all way down to the final target quench temperature, e.g., room temperature.). Then, the heat exchanger is utilized to impart further cooling and at an exponential rate to the low (target) temperature.

The invented single step system integrates nanoparticle synthesis and nanoparticle surface coating. It provides thermochromic materials and the related processing technologies featuring nano-composites of anisotropic core-shell nanocomposites (e.g. nano-rods, nano-tubes, nano-cages and other asymmetrical forms) of $VO_2$. Aside from $VO_2$, the other solid oxide thermochromic materials are suitable, including but not limited to $V_2O_5$, $V_2O_3$, $VO$, $V_6O_{13}$, $Ti_2O_3$, $Ti_3O_5$, and combinations thereof. In an embodiment of the invention, these nanoparticles are substantially uniformly dispersed in a visible light transparent host matrix such that the concentrations of the nanoparticles are about the same throughout the matrix. In other embodiments, the nanoparticles may be more concentrated in some regions of the matrix compared to other regions. $VO_2$ nanoparticles with different sizes, shapes and aspect ratios are first synthesized to tune the SPR properties in those nanoparticles. Optionally, the reaction conditions are modified to dope the particles (for example with tungsten and/or magnesium) to tune the particle's temperature transition point from monoclinic to rutile phase. Doping tunes the charge density in the $VO_2$ material, which affects the energy required to close the band-gap of this material. An increasing doping amount leads to a lower transition temperature.

Figure 2:
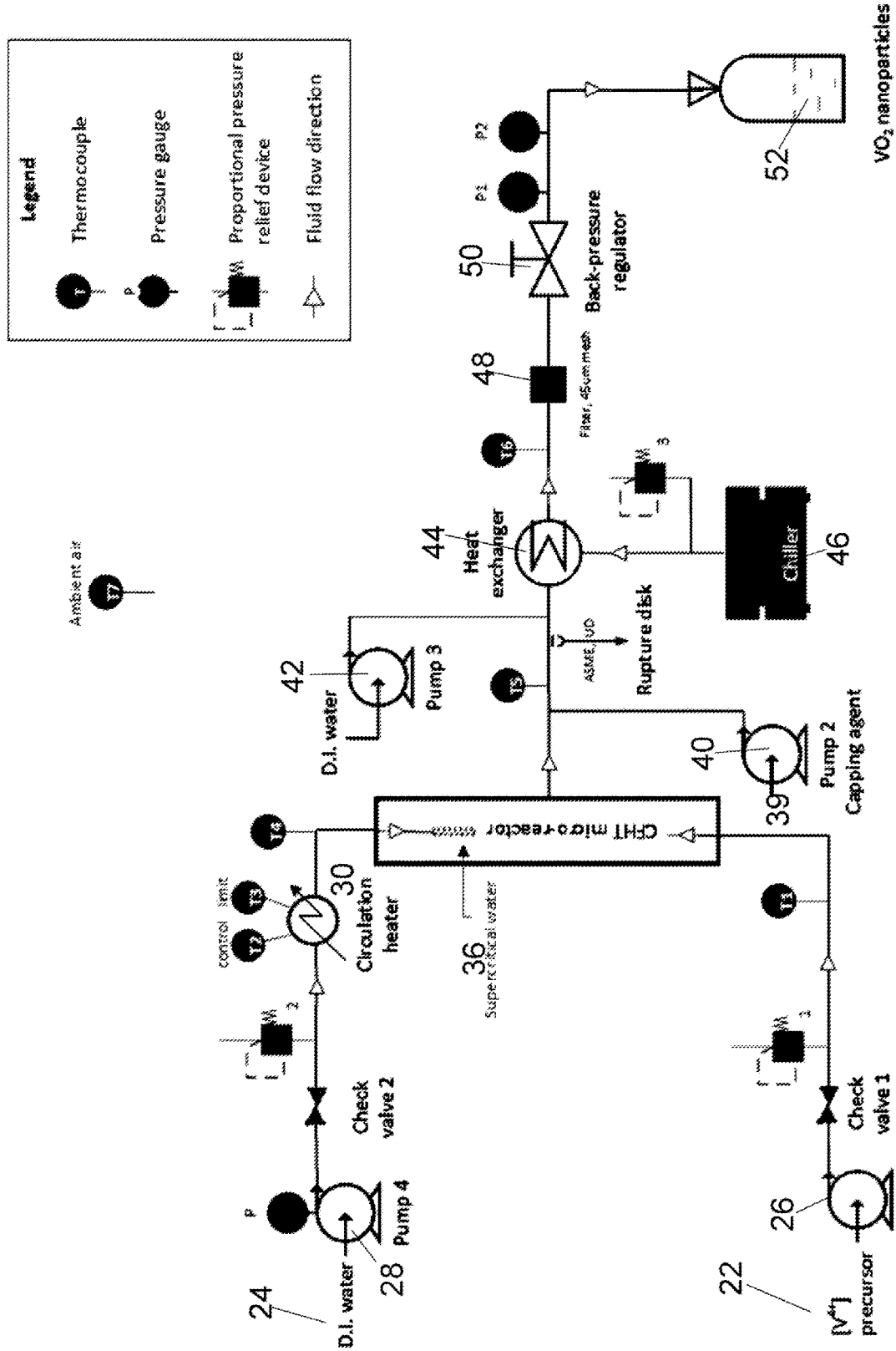
FIG. 2 is a schematic diagram of a continuous flow (hydrothermal) micro-reactor system for synthesizing size and shape controlled core-shell nanoparticles, in accordance with features of the present invention.

FIG. 2 is a Schematic of the continuous flow hydrothermal (CFHT) synthesis apparatus. The experiments begin at Pump 1, element number 26, and Pump 4, 28, which respectively impose positive pressure to the vanadium precursor 22 and DI water 24. The pressurized precursor 22 and water 24 are first heated to supercritical conditions via a heater 30.

The heated precursors and water mixture are then individually fed into a micro-reactor 36 which acts to maintain the heat during the reaction. The precursor solution itself contains water and oxalic acid in one pump, and a separate pump heats room temperature water to supercritical which that feeds into the whole CFHT system itself. It is preferred that the precursor and water are not premixed prior to the heating fluid (i.e., supercritical water) contacting the precursor so as to form and maintain small particles. Thus, the benefit to directly feeding the precursor immediately into the supercritical water zone is the instantaneous formation of ultra-small nanoparticles.

Formulation of the target particles occurs within the micro-reactor 36. (Optionally, upon leaving the micro-reactor, 36, the particles combine with a capping agent 39 via Pump 2, 40, positioned downstream from the micro-reactor.) The nanoparticles formed in the micro-reactor 36 are then quenched by a flow of room-temperature DI water via Pump 3, 42. Quenching is added with the particles/water mixture contacts heat exchanger 44 and a chiller system 46.

The cooled colloidal solution may then be run through a mesh filter 48 before passing a back-pressure regulator 50 and being collected as the final nanoparticle product in a collection reservoir 52. Suitable mesh sizes are 7, 15, 20, 30, 45, 60 micro pore meshes. However, inasmuch as the invented system generates relatively smaller particles than those previously obtained in the state of the art, and inasmuch as the flow rate of the invented process is larger (e.g., greater than 75 mL/min and preferably greater than 100 mL/min), no mesh is required.

Operation Detail

In a typical experiment, the chiller, 46 is the first to be initiated: it employs a circulation heat exchanger to lower the temperature of hot fluids that pass right after the reaction zone 36. Next, the pumps 1, 2, 3, and 4, all initially connected to deionized water (DI) water were set to the desired flow rate and turned on. The pressure (e.g. at 22-24 MPa) was gradually stabilized at and above supercritical water pressure and the circulation heater was then turned on.

Once the temperature of the water inside the heater (from Pump 4) reached a steady temperature just above supercritical conditions (>374° C.), the precursor solution is fed to Pump 1, 26, to officially start nanoparticle synthesis. Once this precursor solution from Pump 1, 26, met the heated supercritical water from Pump 4, 28, in the CFHT micro-reactor, 36, the $VO_2$ nanoparticle product formed. The fluid from Pump 2, 40, optionally meant for a capping agent, is connected to DI water. The hot colloidal solution was immediately quenched with a stream of room temperature DI water from Pump 3 and the solution circulated through the heat exchanger before optionally passing through a mesh filter and through the back-pressure regulator. Finally, the end product of $VO_2$ nanoparticles dispersed in water, hereby known as the resulting colloidal solution, was collected at the end of this apparatus.

It should be noted that the fluid temperature is measured at different points throughout the CFHT system using a plurality of sensors. Six thermocouples, designated as T1-T6 are shown. One thermocouple is placed after the precursor pump, 26, (which maintains room temperature conditions), two are placed within and just outside a circulation heater 30 as a control and limit measurement as a safety measure respectively, one is placed in the fluid line right after the circulation heater to measure the supercritical hot water temperature upon exiting the heater, one is placed right after the micro-reactor to measure the reaction temperature at which the nanoparticles formed, and lastly one was placed after the heat exchanger to ensure that the temperature of the colloidal solution was cooled sufficiently before running through the back-pressure regulator. A final thermocouple external to the CFHT system was placed inside the fume hood above the apparatus to monitor the ambient air.

The advantages of hydrothermal synthesis includes the following:

Water is cheaper and environment friendly as compared to other syntheses in which the chemical solvents are used;

Elevated temperature can result in accelerated reaction kinetics, thus a short reaction time can be realized, typically in seconds;

A reaction under elevated temperature and pressure (T/P), especially in super-critical condition, provides a reaction environment where heat and mass transfer exist, which increases reaction conversion efficiency and yield;

Finally, a continuous flow micro-reactor has limited explosion safety concerns since only a small fraction of reactant is heated at a time. Also, continuous flow reactors mimic microwave's rapid heat transfer through increased surface/volume ratio.

The aforementioned advantages of hydrothermal synthesis compares more favorably to state of the art particle synthesis protocols wherein all reactants are heated in autoclave (e.g., in batch mode). This has the potential of explosion if the autoclave is over-pressurized.

Suitable precursors are those which can be dissolved in solvents which allow the formation of the V4+ solution. For example, liquid solvents include a reducing agent to facilitate conversion of a V5+ precursor into the V4+ clear solution are suitable. Reducing agents such as oxalic acid, hydrochloric acid, or sulfuric acid, and ammonia accompanied by zinc amalgam can act as a reducing agent to reduce V5+ to V4+.

As such, suitable precursors include, but are not limited to $V_2O_5$, $VOSO_4$, $VOCl_2$, and combinations thereof. The concentration of the precursor solution should be in the range of 0.01-1 mol/L. This higher acid molar ratio increases yield of product by ensuring more conversion of the V5+ species to V4+.

The pH value of the precursor solution should be in the acid regime, pH<3, e.g. using higher acid molar ratio in $C_2H_2O_4 \cdot 2H_2O/V_2O_5$ >3.

Surprisingly and unexpectedly, the inventors found that smaller (30-50 nm) target particles can be generated when precursor flow rate is increased, for example if the flow rate is increased 1.5 to 2 fold. This is due to the fact that increasing precursor flowrates enhance hot water/precursor mixing, thereby leading to rapid heating, and particle nucleation. This consumes the precursor in solution in a short period of time such that no further growth occurs inasmuch as the precursor is the limiting reagent. The inventors also found that capping coupled with high ° C., can still produce small particles.

Vanadium ion concentrations in the precursor range between about 0.003 and 1.0 mol/L, and preferably from about 0.01 to 0.1 mol/L. Surprisingly and unexpectedly, the inventors found that while the low concentration of precursor tends to make smaller particles, this trend terminates around 0.01 mol/L, which is to say the particles do not get any smaller if concentrations are reduced further. Spheres or rods ranging in size of between about 10 and about 300 nm result. Anisotropic particle fabrication begins with heating the reaction solutions to between approximately 240° C. and approximately 350° C., for between about 0.1 and about 5 minutes (and preferably less than 1 minute). Aside from the aforementioned high precursor flow rate, a short resident time also results in small particles. Selection of the resident time depends on the reaction temperature.

To maintain stable operation, reaction pressures are high enough to prevent water evaporation under that temperature. In one reaction sequence, the inventors found that a relatively long resident time resulted in pure M-phase $VO_2$ being produced.

The construct 24 is dispersed in deionized water to make a suspension 26 so as to facilitate its uniform dispersion in the organic matrix. (It is noteworthy that a typical annealing step is not utilized at this point in this system.) The construct may undergo surface modification upon the addition of methylacryl-functional silane to facilitate dispersion of inorganic $VO_2/SiO_2$ in the organic matrix film. Suitable silane couplers are commercially available, including, but not limited to γ-methacryloyloxypropyltrimethoxysilane, which is marketed as KH-570 by Gaizhou Hengda Chemical Co. Ltd., Gaizhou City, China.

Alternatively, a polymer coating can be designed with a certain thickness so that the formed $VO_2$/polymer core-shell structure has matching refractive index with the matrix transparent polymer film. Should the coating polymer can survive under SC water, the in-situ coating method can be used to make the core-shell structure in the same process in a single step.

Finally an ester-linked polymer (e.g., polyurethane), or similar transparent PMMA or PVB is added to convert the suspension 26 to a transparent hybrid polymer-nanorod dispersion 28. The core-shell construct 24 is well separated without fusion. Sonication may be used to enhance dispersion for both the as-made colloid solution and the colloid/matrix polymer composite mixture.

When colloidal solution having an original average particle size of ~60 nm is sonicated, particle size increases over time. For example, the particle size increases with time in the range of 16 (30 sec), 20, 40 60 (70 minute), then relatively stable after. But while agglomeration occurs for non-coated $VO_2$, the capping feature of the invention provides a means to obtain stable and ultra-small particles even at high temperatures.

The resulting liquor 28 is then applied by a coating method (such as slot-die coating, spinning coating, or a kiss gravure roll-to-roll coating method) to an optically transparent substrate 30 such as glass, quartz, plastic polyester film, e.g. polyethylene terephthalate (PET), and combinations thereof. The substrate is cured at between 75 and 95° C. at a temperature and for a time sufficient to harden the final construct. For example, heating temperatures of between about 75 and 95° C. and times from between about 5 and 15 minutes are suitable. (One embodiment hardened when subjected to 90° C. for about 10 minutes.) The result is a thermochromic window film or glass 32. The optically transparent substrate may be solid, or a mesh. The optically transparent substrate may be rigid or flexible.

At about 20° C., LT of the particles was about 46 percent and solar transmittance was 53 percent. At 90° C., LT was about 40 percent and solar transmittance was about 31 percent.

Nanoparticle Detail

A salient feature of the invention is the incorporation of nanoscaled (e.g., below about 200 nm length) particles with large aspect ratios. Surprisingly and unexpectedly, the inventors found that such large aspect ratios (between about 1:3 and about 1:10) particles exhibit stronger SPR than less anisotropic morphologies. The SPR phenomenon exists in the metallic phase (high temperature) but is absent in the insulating phase (relatively low temperature). The localization of the SPR, due to the high aspect ratio rods, is the result of more efficient separation of electrons, thereby contributing to the intensification of light absorption and scattering from metal nano-materials. This vastly improves the optical contrast between the metallic and semiconducting states in the near-IR region of the spectrum as a result of dielectric confinement. FIG. 5, discussed infra, describes the SPR phenomenon.

Throughout this specification, particles comprising $VO_2$ are discussed, but only for illustrative purposes only. Other materials which also exhibit semi-conductor to metal transitions (when similarly modified using techniques disclosed herein) at temperatures between 20° C. and 30° C. are also suitable, e.g., other vanadium oxides, chromium-rich pyropes, titanium oxides, zinc oxides, and Pb(II) oxide. Such modifications include the use of dopants, surface treatments, and dimensioning, as discussed herein.

In addition, the invented nano-scale semiconductor enhances visible-light absorption, for short wavelengths, via band-gap widening. This increases luminous transmittance (LT). Moreover, dielectric properties of the nanoparticle surfaces can significantly affect light transport across the material, and that transport can be precisely tuned via nano-coatings or doping (such as the $SiO_2$ coatings discussed supra) wherein the coatings may be conformal to the underlying core particle.

Generally, the nanoparticles are small enough to effect suitable quantum confinement of between about 2 and 10 nm between homo and lumo positions. (Homo is the acronym for highest occupied molecular orbital and lumo designates lowest unoccupied molecular orbital.) This will allow for a larger band gap and subsequent blue-shifting of light absorption (i.e., from longer to shorter wavelengths). Together with solid volume fraction control, LT therefore increases from about 0.4 to about 0.8. More transparency results.

The inventors found that the size, shape and surface morphologies of the particles effect the SPR. Small core-shell nanoparticles are observed having significantly enhanced SPR. Further, anisotropic particles with aspect ratios of at least 1:2 have stronger SPR than isotropic particles. As such, nanorods and nanotubes have stronger SPR than spheres. This phenomenon is explained in conjunction with FIG. 5, discussed infra.

The inventors found that controlled surface properties also effect the optical effects of the nanoparticles. For example, upon coating the particles with an organic moiety, either in conformal or non-conformal topography may reduce any refraction index mismatch between the embedded particles and its matrix material (polymer). This leads to enhanced light transmittance (LT).

In an embodiment of the invention, an organic material is dispersed in an aqueous mixture and pumped into the supercritical water directly, either contained in the precursor solution itself or through a separate pump from the precursor. Generally, the organic moiety is pumped into the system in mostly liquid form. Liquid form can include solid moiety suspended in a fluid in a concentration to still allow it to be pumped into the system. The system may be the already available super critical water, and/or a dedicated solvent for the moiety.

The organic material may be short-chain surfactant, or long chain polymer that can withstand high temperatures imposed by the supercritical fluid and added to purposely functionalize the particle surface. The organic material may be entrained in an oil-in-water emulsion or solid suspension and introduced into the system at a location downstream of the supercritical fluid. Such functionalization includes attaching hydroxyl, carboxyl, or other moieties to the particle's surface. The resulting particle-organic composite has a multifold effect, including facilitating the nucleation of stable, small particles suspended an aqueous solution while preventing aggregation, and depending on the functional group coated on the nanoparticle, facilitating separation of the nanoparticles from the aqueous solution.

The organic material comprises a group of specific materials that can withstand temperatures greater than 370° C. The material may define one end that can be attached to a $VO_2$ nanoparticle covalently via condensation reaction and another other end that contains a group that facilitates dispersion in supercritical water and a polymer solution. Generally, the organic material is from a genus selected from the group consisting of carboxylic acids, amines, polymers, polyols, and combinations thereof. For example, the organic material may be a compound selected from the group consisting of —COOH moieties (e.g. decanoic acid, oleic acid or hexanoic acid $CH_3(CH_2)_4$—COOH); -amine ($NH_2$) moieties (e.g. oleylamine, Hexadecylamine, $CH_3(CH_2)_5 NH_2$, Cetyltrimethylammonium bromide (CTAB)); polymers (e.g. polyvinylpyrrolidone, or PVP), Polyols (e.g., ethylene glycol, polyethylene glycol) and combinations thereof.

Nanorods are continuously prepared via flow-enhanced hydrothermal synthesis with an acid environment (e.g., sulfuric acid). A micro flow (between about 2 ml and about 40 ml/minute) process offers advantages over autoclave batch reactors, including but not limited to acceleration of reaction rate, prompt start up, uniform temperature distribution in reaction solutions, facile control over reaction conditions, shortening of the synthesis cycle, and scalability. Therefore, high-quality nano composites (such as nanorods, nanotubes, nanocages, and other asymmetrical particles) and more narrow size distribution of the nanorods are synthesized.

The invented process and system controls the reaction conditions to obtain targeted nanoparticles. This is done by 1) rapidly heating up the flow system to a sufficiently high temperature such that the precursor can be decomposed to reach a super-saturated state; 2) If hot-water is used as a heating medium, transient mixing between water and the reactant prevents a large temperature distribution which results in mixed phase materials (e.g. A/B/M phase $VO_2$); 3). After particle nucleation occurs, one can control the resident time and its distribution to manipulate particle growth:— short resident time leads to smaller particles; 4) rapidly cooling the system along the flow path is required since this can stop the growth of the particles per inter-particle agglomeration. By using a low PH value, a higher ratio of anisotropic to isotropic materials is realized as is pure M-phase $VO_2$.

In instances where A and B phases of $VO_2$ are generated hydrothermally, the inventors found that converting $VO_2$ (A) phase as synthesized to rutile $VO_2$ (M) phase can be realized by thermal annealing. The metal-to-insulator transition temperature of the $VO_2$ (M) is relatively lower (approximately 65° C.) such that the modulation of IR absorption could better fit the energy consumption budget of buildings. Further conversion temperature reduction can be obtaining via Mg and/or W doping.

"Light" as discussed herein, includes wavelengths between approximately 380 nm and 10,000 nm, which includes infrared radiation. Visible light is defined at that between about 370 and about 720 nm.

Continuous Flow Micro-Reactor System Detail

The invented system applies hydrothermal synthesis, which is endothermic in nature, to continuously generate the nanoparticles or nanorods. It is capable of synthesizing kilogram quantities of high-quality core-shell nanocomposites every 24 hours. The system makes nanoparticles having the above-described well-controlled morphology (as described supra), and in a highly efficient and scalable manner. The system is capable of producing composite nanoparticles at temperatures below 450° C., and at pressures below 250 bars.

In an embodiment of the invention, given about 3.3 kilograms (kg) of starting material, at least 3 kg quantities of the particles can be produced in 24 hours, with a 10-channel device (having a channel inner diameter of about ¼ inches), and a flow rate of about 3 ml/min in each channel. In another embodiment of the invention, given a 2.5 ml/min injection rate and 5 reactors (having a channel inner diameter of 1/16 inches) in parallel, during a 10 hour reaction period, approximately 625 grams of the nanoparticles are produced.

Salient features of the reactor system include incorporation of a single microflow reactor. A myriad of micro flow reactor configurations can be utilized, including coil, tubing, as well as acoustic/ultrasound probe, or fluid jet assisted tubing, wherein flow rates are in the range of about 5 to about 30 ml per minute, given a tubing reactor volume of 16 ml.

To obtain uniform powders (e.g., core particles all having the same size and shape +/−5 to 10 percent), a rapid heating rate such as that provided by supercritical heating water (e.g., >372° C., 221 bar), is preferred. As an example, a temperature rising speed of about 5° C. per second results in a more narrow size distribution of nanoparticles than that of 0.8° C. per second for a batch synthesis. The inventors have determined a heating rate of about 100 to about 200° C. per second, and preferably about 150° C. per second or higher. These heating rates are due to heat transfer from the supercritical water to the reactant flow. They are empirically based on a precursor residence time in the micro-reactor 36 of between 1 and 3 seconds. As such, longer residence times may call for faster heating rates. Optionally, mixing is employed in vessel reactor scenarios. In an embodiment, mixing is primarily done in the micro-reactor, 36.

A key feature of the invention is that the continuous flow hydrothermal reactor provides instantaneous heat at the moment of exposure to the precursor thereby replicating the beneficial effects of a microwave reactor. So although the heating rate in the invented system takes time to heat water to supercritical itself, the heating rate of the heater is less relevant than the fact that the pre-heated water instantly interfaces with the precursor. This differs from state of the art batch process where the contents of the precursor and the solvent (water) are heated together. In summary of this point, the present invention, provides a discreet separate process wherein the precursor and water meet and react.

Reactant flows along a flow path in the tubing reactor. Initially, the reactant is in solution form, sans any solid phase. As the solution is heated while traversing the tubing reactor, hydrothermal reaction occurs, which is to say that the reaction occurs in hot water and not an organic solvent. This process facilitates both nanoparticle nucleation (at a first location) and particle growth (at a second location). Each location can be separately heated. This provides a means for synthesizing precisely controlled morphologies in a narrow size distribution (e.g., +/−1 nm). A detailed description of nanoparticle morphology control in micro-reactors can be found in *J. Mater. Chem.* 20 (2010) pp 8454, the entirety of which is incorporated by reference.

Nanoparticle size is also controlled by tuning the flowrate (e.g., the residence time) of the reactant and/or carrier fluid. Generally, the slower the flowrate, the larger the nanoparticle. Flow rate can be determined via the following equation $$Q = \Pi/4 \times d^2 \times U \times t,$$

where Q is the fluid quantity, d is the inner diameter of the tubular reaction chamber, U is velocity of the fluid and t is time.

The reactants, $V_2O_5$ or $VOSO_4$ 42, and a mild acid 44 acting as a reducing agent can be mixed in advance, or introduced separated and mixed in the mixer to make a clear liquid solution. Any compound with a pKa of about 3 or lower can be utilized. Exemplary such compounds include, but are not limited to oxalic acid, formic acid, tartaric acid, polyethylene glycol, and combinations thereof.

The resulting solution is pumped into the continuous micro flow tubing reactor. Generally, a tubing with an outer diameter of less than ½ inch is suitable. Also suitable is any tubing which can withstand temperatures up to at least 370° C. and at least 300 atmospheres.

$VO_2$ nanoparticles are generated in the heated tube reactor and may grow continuously along the flow path in the tubing reactor; then particle growth stops in a cooler that is situated downstream from the reactor. Optionally, another cooler 47 is placed immediately upstream of the reactor to prevent premature reactions from occurring, thereby leading to the generation of solids which can block the flow path.

A back pressure regulator may be installed at the downstream of the tubing reactor to control the system pressure while simultaneously allowing the liquid to flow through. A particle collector such as a filter may be installed in front of this pressure regulator in order to block and collect the large nanoparticles that may otherwise contact the pressure regulator.

The invented system continuously synthesizes nanoparticles at temperatures ranging from about 240° C. to about 450° C., and at pressures ranging from about 20 bar to about 275 bar, and preferably from 200-240 bar.

The invented design implements single phase liquid flow (carrier+reactant solution), or gas-liquid two-phase segment flow in the flow path to enhance heat transfer and maintain thermal and pressure stability within the system.

Four types of reactors for nanoparticle synthesis 48 can be utilized, including coiled tubing reactors, and ultrasound probe, or pulsed jet-assisted micro reactor. The aim is to enhance heat transfer and maintain thermal and pressure stability within the system via super-heating water, and supersonically enhanced mixing via ultrasound probe or pulsed water jet. This leads to an increase in the temperature raising rate.

The rapidly heating assisted design features enhanced mixing, is employed. The rapid heating strategies include: 1) agitated high-temperature water; 2) ultrasound-generated water jets or pulses; 3) an ultrasound probe. The range of temperature rising speed of the precursor is 30~300° C. per second. Preferably, the heating rate is between 50 and 250° C. per second, and most preferably between 100 and 200° C. per second. In an embodiment of the invention, rapid heating of the precursor can be achieved by using a high-temperature supercritical water flow, >374° C., coupled with an artificially enhanced turbulent mixing with Re>2100. This can be realized by using a porous hot water distributor, high flowrates of either precursor or heating water flow, externally applied ultrasonic wave, and so forth.

Another feature of the invention is the elimination of surfactant anywhere during the primary particle formation reaction, or pre-reaction mixing process. Whereas surfactants were utilized in past systems to prevent reactants from sticking to surfaces in the reaction chamber or supply conduits, such sticking is not an issue inasmuch as supercritical water and not reaction system surfaces are used as heating loci. However, in instances were a capping agent is utilized to overcoat the already formed primary particles downstream of particle formation, surfactants may be used and injected from the capping agent pump. Exemplary surfactants include, but are not limited to, Polyvinylphenol (PVP), (Sodium dodecyl sulfate) SDS, Polyethylene glycol (PEG), Cetyl Trimethyl Ammonium Bromide (CTAB) and 3-(trihydroxysilyl)-1-propanesulfonic acid (SIT) and others.

While an embodiment of the invented process relegates the mixing of precursor(s) and supercritical water solely within the confines of the micro-reactor 36, premixing can still occur when several precursors and other reactants are mixed together prior to contact with supercritical fluid and introduction into the micro-reactor. As such, a plurality of precursors 22 may be provided and mixed to create a pre-reaction mixture or liquor.

One of the precursors may be a V4+ solution capable of being converted into $VO_2$ nanocrystals upon heating, which then transition from a monoclinic crystal phase to a rutile phase. This nanoparticle may first be doped with W, Mg, Mo, Ta, Nb, Ru, Sn and combinations thereof. This dopant may be another of the precursors, or premixed with the reactants. A suitable doping protocol is found in Lan, et al., Heteroepitaxial TiO2@W-doped $VO_2$ core/shell nanocrystal films, RSC Adv., 2015, 5, 73742, the entirety of which is incorporated herein by reference.

Separately, while an embodiment of the invention utilizes water as the supercritical fluid, other materials are also suitable. Selection of such fluids may be based on precursor solubility considerations, or chemical compatibilities (for instance the need for non-oxygenated solvents when considering air-sensitive processes). Thermo-kinetics is also a factor wherein reactants cannot withstand a high temperature under a supercritical water, or product separation occurs (e.g., $CO_2$ becomes a gas when it flows out from the reactor and automatically separates from the solid product.

In light of the foregoing, exemplary fluids and/or fluid types include, but are not limited to, water, $CO_2$, alkanes or aromatics, all in liquid phase, gas phase or a combination of liquid and gas phase. More than one fluid may be utilized simultaneously, with all of the fluids present being in liquid phase, or gas phase or a combination of phases. All exist as a supercritical fluid state during the synthetic reaction operation (i.e. neither gas, nor liquid).

Example

Reaction conditions for an exemplary bench top continuous flow hydrothermal core-shell particle fabrication system include a ½" OD tubing micro-reactor, approximately 36 cm in length, with other inlet and outlet tubing of ¼" OD. An HPLC pump is utilized to drive the precursor fluids through the mixer and micro-reactor while another diaphragm pump is utilized to pump water into the heater and micro-reactor. A stainless steel tube reactor operated under 400° C. and 240 bar may be utilized as the flow micro-reactor. A heat exchanger in fluid communication with the loop is utilized. A back pressure regulator is used to tune and maintain the system pressure. Optionally, a safety relief valve or rupture disk is provided with a maximum pressure setting of 270 bar.

The starting reagent for the experiments was a 0.0356M $[V^{4+}]$ precursor solution made using 1 mol vanadium pentoxide ($V_2O_5$, 1.29 g) to 3 mol oxalic acid dihydrate ($C_2H_2O_4.2H_2O$, 2.69 g). The solid powders were mixed with 400 mL of deionized water (DI) and diluted further for latter parametric studies. The resulting opaque, brown solution was placed in an ultrasonication bath at 60° C. for 3 hours or until the solution turned a clear, aqua blue. 1 mol V2O5 to 4 mol $C_2H_2O_4.2H_2O$, was used in the last experiment's precursor solution, which became a clear, deeper blue color.

The continuous flow hydrothermal (CFHT) system was custom-built within a large chemical fume hood and featured several safety measures including check valves to prevent back-flow, seven thermocouples for temperature monitoring, a back-pressure regulator, proportional relief valves, and an American Society of Mechanical Engineers (ASME)-stamped and certified rupture disc that would immediately burst in a situation with overpressure. The circulation heater was controlled with a computer monitoring system, connected also to the thermocouples scattered throughout the CFHT apparatus that allowed for real-time analysis of system conditions.

Three parametric studies and a final optimized study were conducted to observe different effects on the particle size including the effect of (1) flow rate, (2) precursor concentration, and (3) diluted precursor coupled with varying flow rate at elevated temperatures. The first two parametric studies maintained reactor outlet temperature between 380-384° C. while the third study was maintained between 382-396° C. The last optimized study used reactor outlet temperatures maintained between 386-390° C.

Lastly, Reynolds Number, a measure of degree of mixing, was calculated for four scenarios:

(1) minimal supercritical temperature and pressure (374° C., 22 MPa), (2) minimal supercritical temperature and maximum pressure capable in this CFHT system (374° C., 24 MPa), (3) maximum temperature capable in this CFHT system and minimum supercritical pressure (400° C., 22 MPa), and (4) maximum temperature and pressure capable in this CFHT system (400° C., 24 MPa).

The equation for the Reynolds Number (Re) was calculated using the equation:

$$Re=(\rho \upsilon D)/\mu \quad (1)$$

where $\mu$ is the density of the fluid in $kg/m^3$, $\upsilon$ is the flow rate in m/s, D is the diameter of the tube in m, and $\mu$ is the dynamic viscosity of the fluid measured in Pa-s.

The values of flow rate and diameter were physical dimensions obtained from the experimental setup in the reaction zone of the CFHT apparatus, while the density and viscosity values were obtained through data from the National Institute of Standards and Technology (NIST) references. A dimensionless value greater than 4000 indicated turbulent flow, a value less than 2100 was classified as laminar flow, and any flow falling in-between this range was considered transitional.

Characterization

Detail

The colloidal solutions from each experiment were allowed to cool down to room temperature before being probed by a MicroTrac NanoFlex Dynamic Light Scattering (DLS) particle analyzer. Using an intensity distribution that was calculated over three runs, the particles' intensity average and number average particle sizes were recorded. The intensity average, also known as the Z-average or the intensity based harmonic mean, gives an indication of a particle distribution weighted by the scattered intensity from the particle, so the presence of larger particles will cause this average to also be large. The number average on the other hand, can give a better indication of the average based on the sizes from a total quantity of particles, i.e. larger particles' higher scattering intensity will not overshadow the measurement of the smaller particles. Both were used to gain insight into the particle distribution of the experiments.

The colloidal solution was then centrifuged to generate supernatant. For example the colloidal solution may be centrifuged three times at up to 40,000 relative centrifugal force (rcf) for 10 minutes each. After pouring the supernatant off the first run, the second and third repetitions of centrifugation were rinsed with DI water and ethanol, respectively. The nanoparticles were left to dry overnight and then used to perform X-ray diffraction (XRD, Bruker AXS) from 10° to 80° 2 theta. Scanning electron microscopy (SEM, Jeol) was also performed to reveal particle morphology and confirm nanoparticle size, generally using a 20 keV electron beam.

$VO_2$ nanoparticles were obtained through a continuous flow process using vanadium pentoxide ($V_2O_5$) as the vanadium source and oxalic acid dihydrate ($C_2H_2O_4.2H_2O$) as the reductant agent. The precursor used for all experiments was 1 mol vanadium pentoxide to 3 mol oxalic acid dihydrate with the exception of the last study which was a 1:4 molar ratio. All experiments were conducted at supercritical conditions at pressures above 22 MPa (up to 24 MPa) and temperatures above 374° C. (up to 400° C. for reactor outlet temperatures). It should be noted that higher system flow rates brought heated water more rapidly throughout the system than lower flow rates, which in turn had an effect of the temperature difference between the hot water thermocouple (T4 in FIG. 2) and the reactor outlet thermocouple (T5 in FIG. 2). For higher flow rates, this means smaller differences in temperature from the heater thermocouple and the reactor outlet thermocouple, but larger temperature differences when lower flow rates were used.

FIG. 3 shows the results of these studies with respect to nanoparticle size using a DLS particle analyzer as well its characterization using SEM imaging. One representative SEM image from the smallest nanoparticles obtained in each study are shown.

For the first parametric study, the concentration of the precursor was kept constant at 0.0356 M [$V^{4+}$] in a 1:3 vanadium pentoxide to oxalic acid dihydrate molar ratio while the total system flow rate was varied from 87 mL/min to 201 mL/min. Shown in FIG. 3A, the DLS particle analyzer showed intensity averages generally decreased from 370.0 nm to 136.5 nm at increasing flow rates, while the number average steadily decreased from 145.1 nm to 70.7 nm. This downward pattern supports the hypothesis that the particles were moving more quickly through the hot reaction zone area at higher flow rates and therefore reducing particle aggregation and/or growth via Ostwald ripening. The corresponding SEM image (shown to the right of the graph) revealed mostly round particle morphology corresponding to most sizing a little larger than 50 nm, but with some significant numbers of smaller nanoparticles less than 50 nm. This wide particle size distribution was also accompanied by a few particles forming more rod-like structures which was thought to be due to the shear forces from the mixing of the precursor and supercritical water at the reaction zone that potentially affected the growth kinetics.

FIG. 3B shows the DLS particle size for the second parametric study in which the flow rate was kept constant at 173 mL/min and the precursor concentration was varied from 0.0356 M (no dilution) to 0.178 M (2× diluted), 0.0119 M (3× diluted), 0.0071 M (5× diluted), and 0.0036M (10× diluted). Interestingly, the intensity average particle size decreased from a diameter of 162.5 nm with no dilution to a diameter of 88.6 nm with a 5× dilution factor before increasing in size again with greater dilution. The number average likewise exhibited a general decreasing trend from 88.5 nm with no dilution down to 21.9 nm with a 3× dilution before increasing in size with further dilution. It was speculated that this increasing particle size trend may be more of a plateau rather than a true increase in particle size, as lower concentrations of nanoparticles tend to hit the limits of the DLS instrumentation and produce noisier data due to the weak signal produced in the sample. The SEM image shown directly to the right of the graph and corresponding to the 0.0119 M [V4+] (3× diluted) sample shows a relatively spherical morphology throughout, indicating that the dilution of the precursor likely aided in reducing the aggregation after nanoparticles nucleated, but due to the high solubility and surface energy of the particles at the water's supercritical conditions, smaller particles may be re-dissolving and some degree of Ostwald ripening may still be occurring, therefore contributing to some of the variation in the particle size distribution.

The third parametric study took this dilution effect into account, and held constant the precursor concentration at 0.0119 M (3×diluted) while varying the system flow rate once again between 87 mL/min and 201 mL/min and additionally elevating the reactor outlet's temperature range. It should be noted that this concentration was selected to balance maintaining small nanoparticle size with the overall nanoparticle yield, which would be greatly affected by diluting the precursor too much. FIG. 3C shows the DLS particle sizes decreased from an intensity average of 199.0 nm at 87 mL/min flow rates down to 103.7 nm at 200 mL/min, the highest flow rate applied. FIG. 3C also shows that the flow rate range is from approximately 60 ml/Min to 220 mL/min. (The 200 mL/min flow rate is based on a ½" diameter reaction chamber diameter.)

The number average particle size likewise decreased from 92.7 nm at the lowest flow rate down to 30.5 and 45.8 nm when the higher flow rates were used. From the SEM image (directly to the right of the graph in FIG. 3C) corresponding with the sample at 201 mL/min, the particle sizes appeared to be much smaller than the smallest particles from the earlier parametric studies. However, while most of the morphology was spherical, there was some evidence of coalescence and occasional nano-rods that formed, perhaps due to the high surface energy of the particles coupled with an inducing effect from high pressure and shearing forces.

Figure 3D:
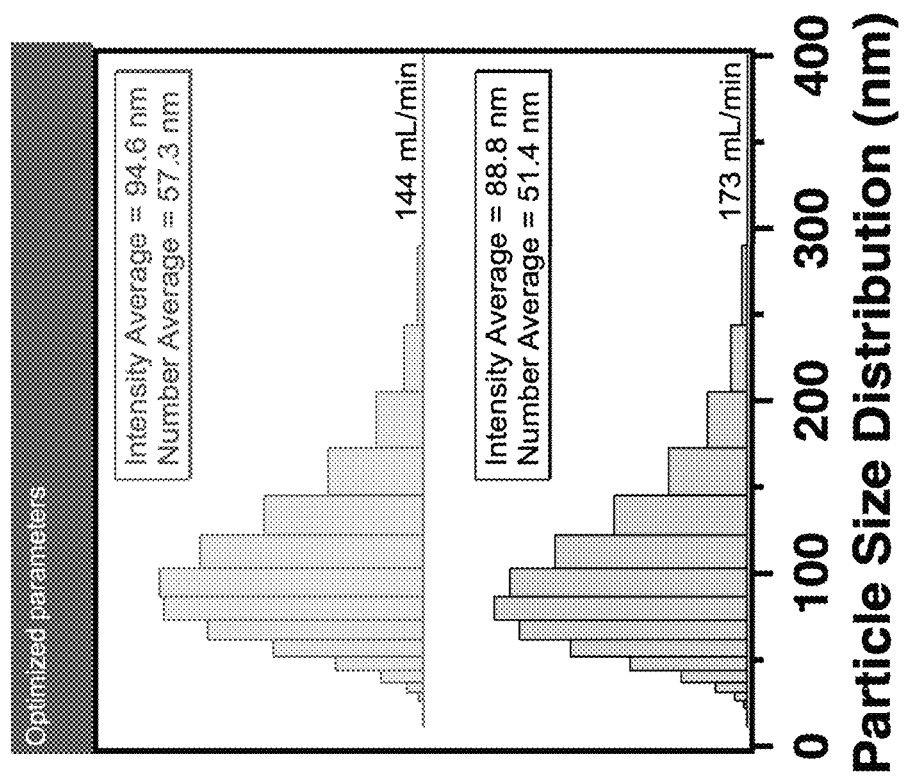
FIG. 3D is a graph and associated SEM image showing optimized particle sizing parameters; in accordance with features of the present invention.

Lastly, the final experimental study was optimized to create M-phase V02 nanoparticles by not only using a 0.0119 M (3× diluted) precursor concentration at higher flow rates, but also changing the molar ratio of the precursor from 1:3 to 1:4 vanadium pentoxide to oxalic acid dihydrate at elevated reaction temperatures. Because it was observed that the former three studies had some presence of yellow supernatant after centrifuging (an indication of $V^{5+}$ present in the solution), it was hypothesized that by using a greater amount of reducing agent, the product yield would increase. FIG. 3D shows the particle size distribution of the two experiments run at system flow rates of 144 mL/min and 173 mL/min. The particle size intensity averages were 94.6 nm and 88.8 nm at those respective flow rates, with number averages at 57.3 nm and 51.4 nm, respectively. The corresponding SEM image (directly to the right of the graph in FIG. 3D shows the nanoparticle sizes were less than 50 nm in diameter with uniform, spherical morphology.

Figure 4A:
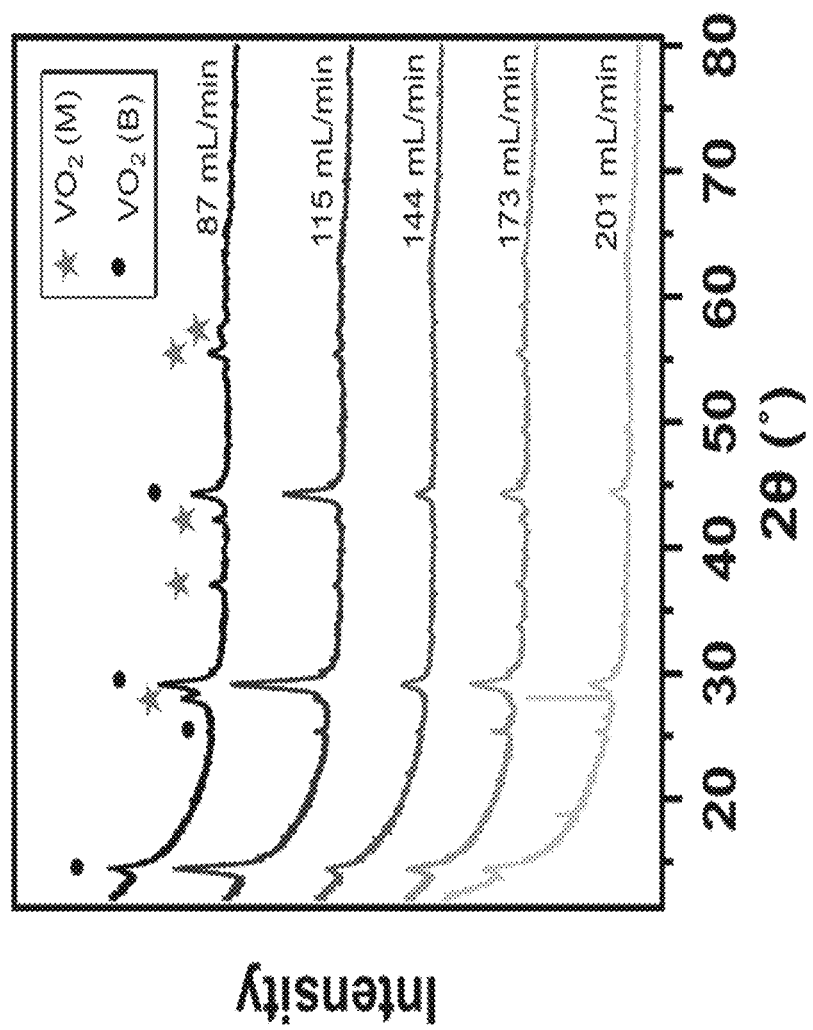
FIG. 4A is a graph showing relative phases of vanadium particles at various precursor flow rates.
Figure 4B:
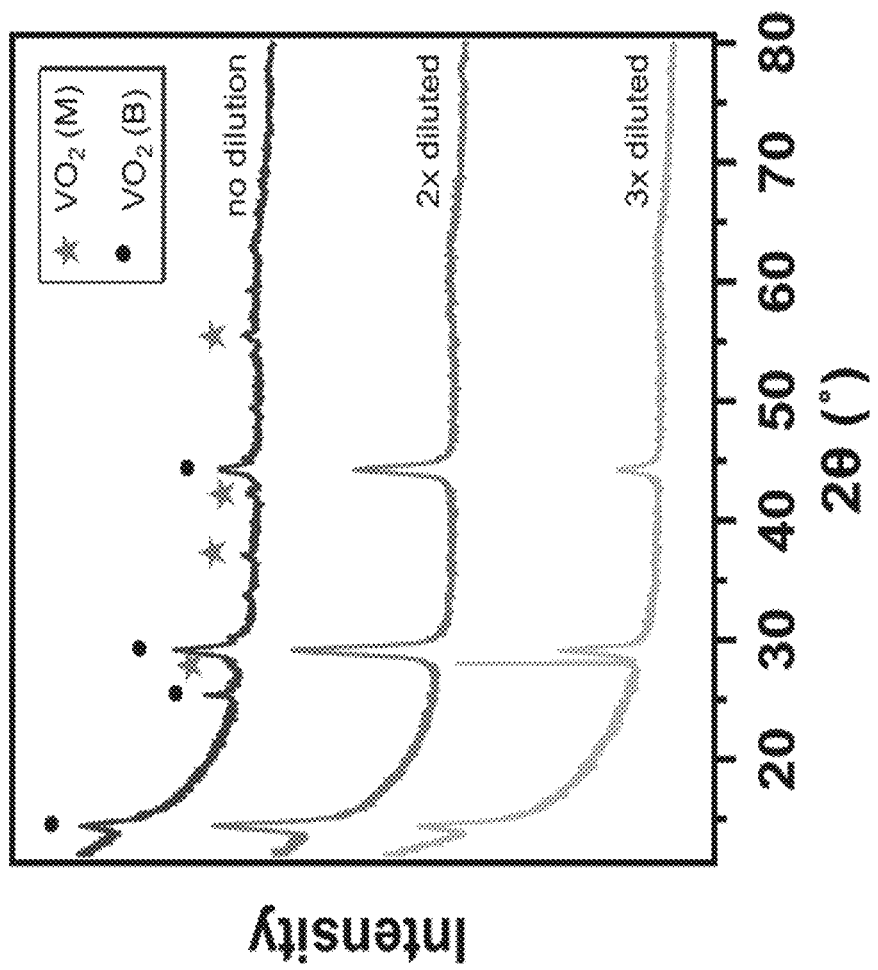
FIG. 4B is a graph showing relative phases of vanadium particles at various precursor concentrations.
Figure 4C:
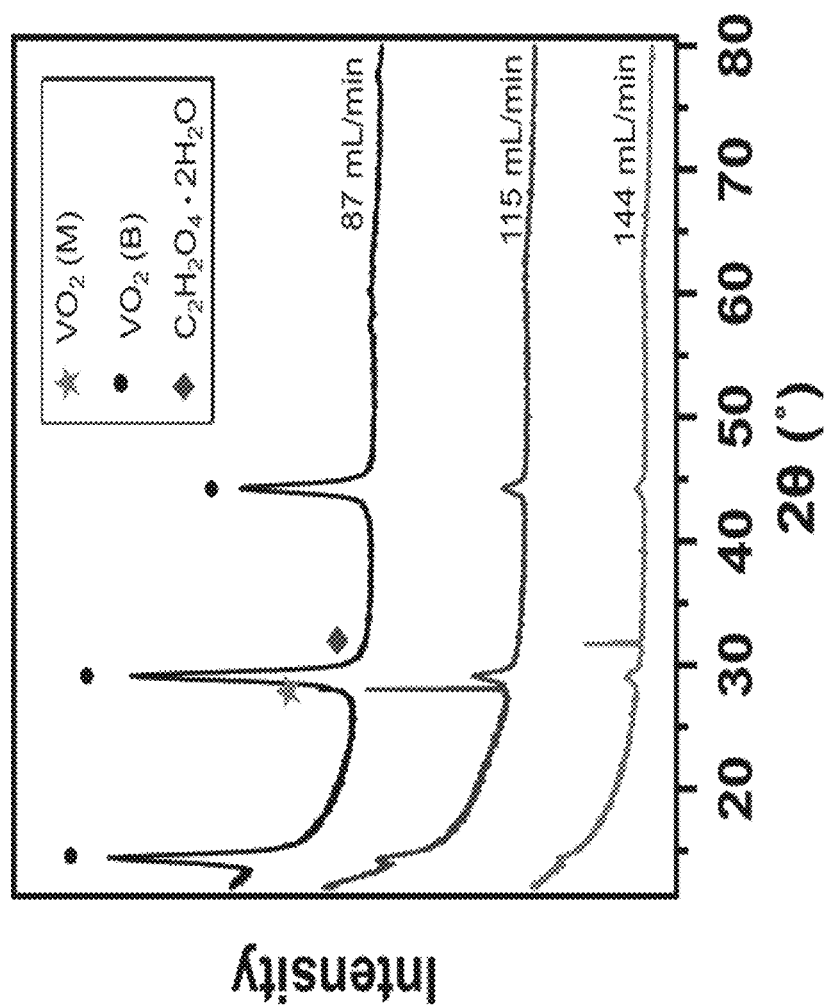
FIG. 4C is a graph showing temperature effects on M-phase conversions, in accordance with features of the present invention.

The addition of extra oxalic acid dihydrate creates a more suitable environment to nucleate more $VO_2$ nanoparticles. FIG. 4 shows the XRD spectra of these four studies. In FIG. 4A (showing varying flow rates), all of the $VO_2$ particles obtained exhibited strong B-phase peaks with the exception of the sample at 201 mL/min. $VO_2$ (B) peaks at $2\theta=14.4°$, $25.4°$, $29.1°$, and $44.3°$ correspond with the (011), (110), (002), and (003) planes respectively. Additive-free hydrothermal setups using vanadium pentoxide-oxalic acid dihydrate systems tend to form $VO_2$ (B) as a major product. The presence of $VO_2$ (M) peaks seen in the sample run at 87 mL/min, the lowest flow rate tested, likely had some limited conversion because of its longer residence time; the nanoparticles were in the reaction zone longer. The inventors surmise that re-emergence of a strong M-phase (011) peak at $2\theta=29.0°$ in the highest flow rate at 201 mL/min, is due to the sufficient amount of heat carried into the micro-reactor coupled with more turbulent mixing.

As for the precursor concentration's effect on the $VO_2$ conversion to M-phase (FIG. 4B), only in the 0.0119 M [$V^{4+}$] 3× diluted sample was a strong (011) $VO_2$ (M) phase peak detected, but it cannot be concluded with certainty that lower concentrated precursors (higher dilution factors) would necessarily result in greater M-phase conversion because samples diluted beyond three times were unable to generate enough particles for further XRD analysis. The higher flow rate sample (at 201 mL/min, see FIG. 4A) shows that more diluted precursor samples mix their components more efficiently at high temperature and therefore convert more nanoparticles into $VO_2$ (M).

For the third study (FIG. 4C), an increase in temperature did not have a significant effect on the conversion to M-phase of a 0.0119 M (3× diluted) sample. The sample at the lowest flow rate tested, 87 mL/min, showed strong B-phase peaks with a slight peak broadening at $2\theta=29.1°$ which indicated very limited conversion to M-phase. However, the sample at 115 mL/min had a strong M-phase peak at $2\theta=28.0°$. This shows that better mixing may be another means for facilitating the conversion. Upon the increase in flow rate to 144 mL/min, a trend back towards $VO_2$ (B) was detected perhaps due to the presence of unreacted reactants; a strong oxalic acid dihydrate peak emerged at $2\theta=31.7°$.

Figure 4D:
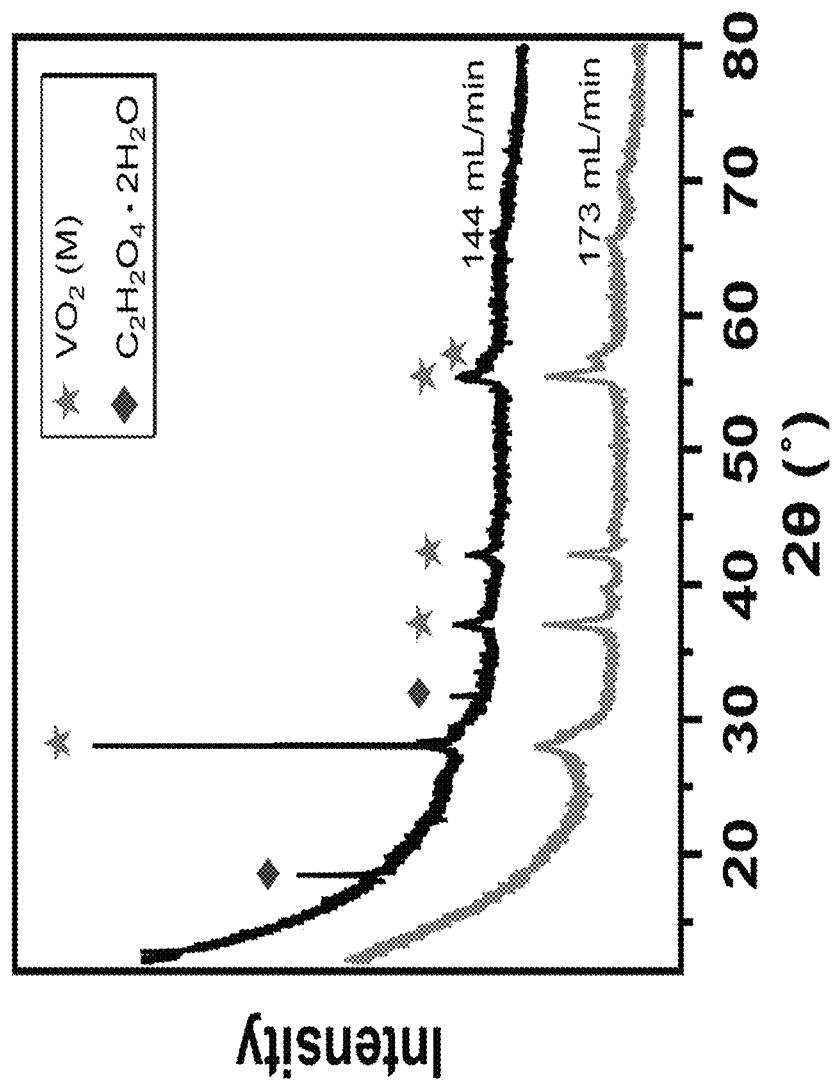
FIG. 4D is a graph showing reductant concentrations and reactor temperatures effects on nanoparticle conversion rates, in accordance with features of the present invention.

In FIG. 4D, the final optimized study, it appeared that the B-phase peaks disappeared in both scenarios, and M-phase was achieved fully at the 173 mL/min system flow rate, while at 144 mL/min, there remained some residual oxalic acid dihydrate. These peaks at $2\theta=28.0°$, $37.0°$, $42.4°$, $55.5°$, and $56.4°$ corresponded to the (011), (200), (−212), (220), and (022) planes in monoclinic $VO_2$. This shows that a higher amount of a reductant agent (along with a higher reactor outlet temperature) was a key parameter in helping convert the nanoparticles completely. The presence of residual oxalic acid dihydrate was observed to also disappear at higher flow rates, perhaps due to the increased availability of water and more turbulent mixing to fully form product with all the reactants.

Figure 6:
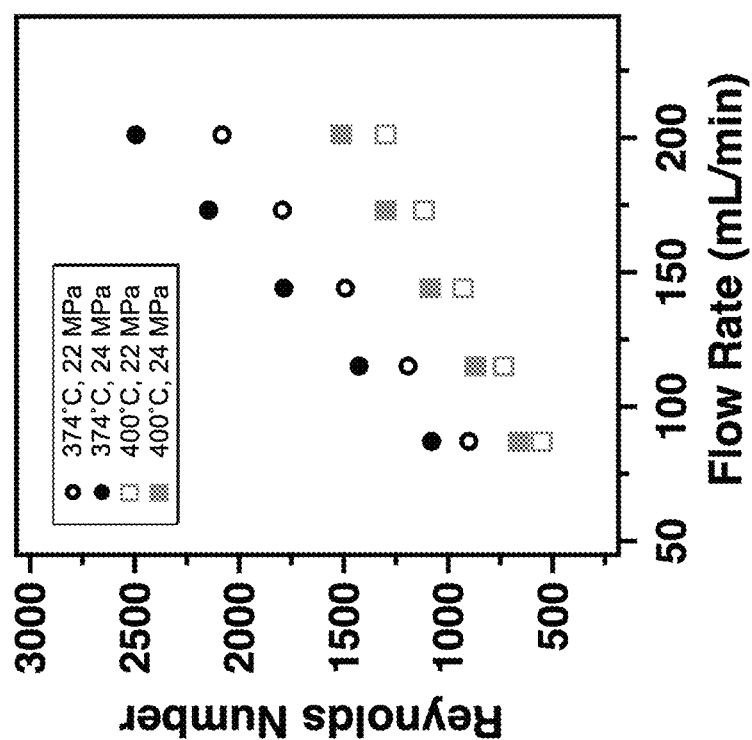
FIG. 6 demonstrates the effect of pressure and temperature on the mixing of the reactants to form $VO_2$ product in the reaction zone, in accordance with features of the present invention.

FIG. 6 demonstrates the effect of pressure and temperature on the mixing of the reactants to form $VO_2$ product in the reaction zone. As the Reynolds Number gives an indication to the degree of mixing in a reactor, it was calculated at the five different flow rates in this CFHT system, the effect on mixing. It was observed then, that only at best did this system exhibit transitional flow (value greater than 2100). In most scenarios used within the scope of these studies' parameters, the flow was laminar.

This plot also shows that the ideal mixing occurs at the highest pressure possible and at the lowest temperature within the supercritical range. It was thought that the higher flow rates which generally exhibited the smallest-sized nanoparticles had better mixing than the system at lower flow rates, and therefore allowed the highest supersaturation rates allowing for the maximum number of nucleation sites. When coupled with a precursor concentration that was diluted (optimally to a factor of 3), these reactants were able to fully form product and the resulting nanoparticles were less likely to aggregate or form larger nanoparticles via Ostwald ripening.

FIG. 7 contains a plurality of SEMs showing a primary particle coated in organic moiety. FIG. 7A shows particles coated in polyvinylpyrrolidone (PVP). FIG. 7B shows a particle coated in cetrimonium bromide (CTAB). FIG. 7C depicts particles coated with decanoic acid. 7D depicts particles coated with polyvinylpyrrolidone (PVP) and cetrimonium bromide (CTAB). Varying the concentration of the organic ligand has an effect on the particle morphology and size. As such, concentration modifications are determined empirically.

Figure 7D:
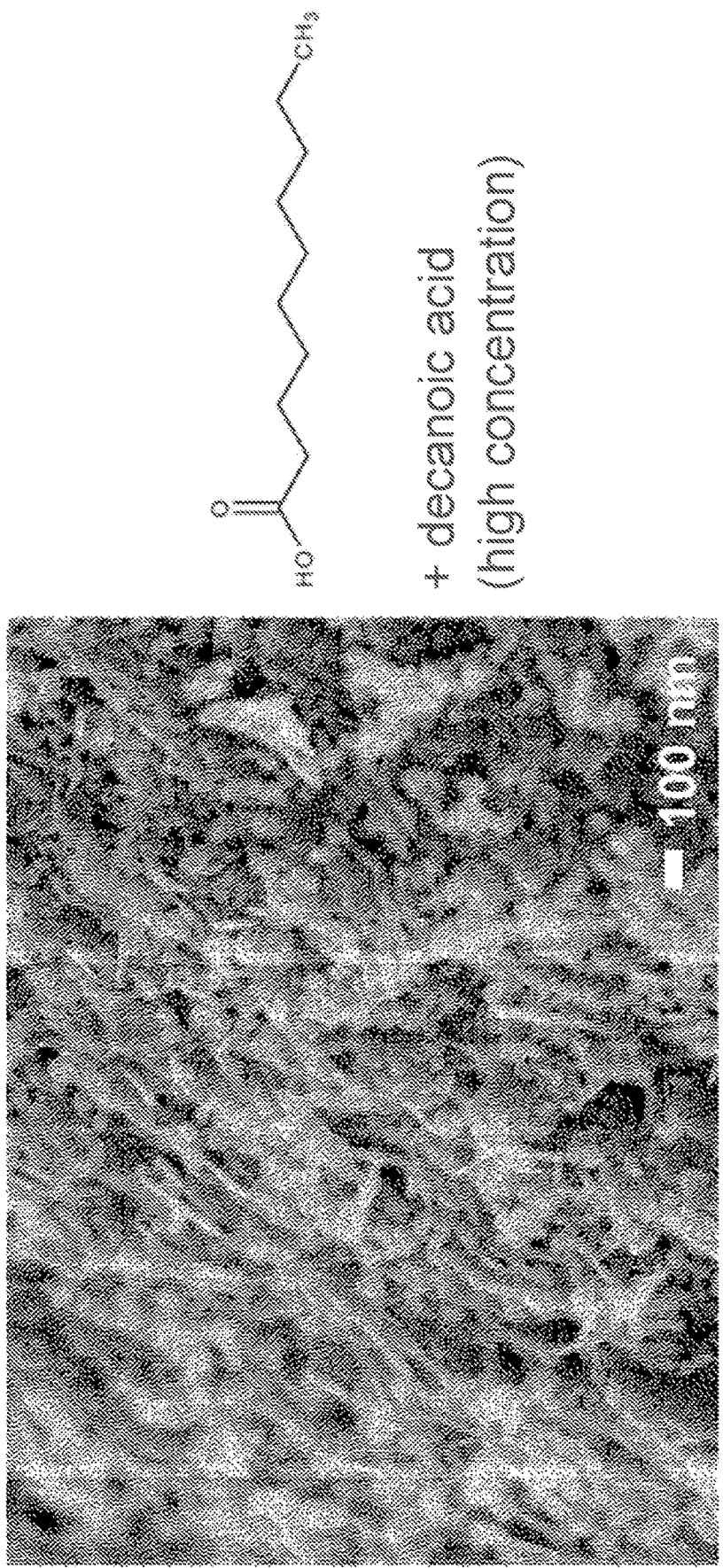
FIG. 7D depicts particles coated with a mixture of polyvinylpyrrolidone (PVP) and cetrimonium bromide (CTAB)

Particle sizes in FIG. 7A ranged from 700 nm to 1 micron, with an ovoid shape (akin to a walnut). Particle sizes in FIG. 7B ranged from 200-300 nm with a spherical or ellipsoidal shape. Particle sizes in FIG. 7C ranged from 30 to 100 nm and were more spherical in shape. Particle sizes in FIG. 7D were 20 nm or greater and primarily spherical.

Figure 8:
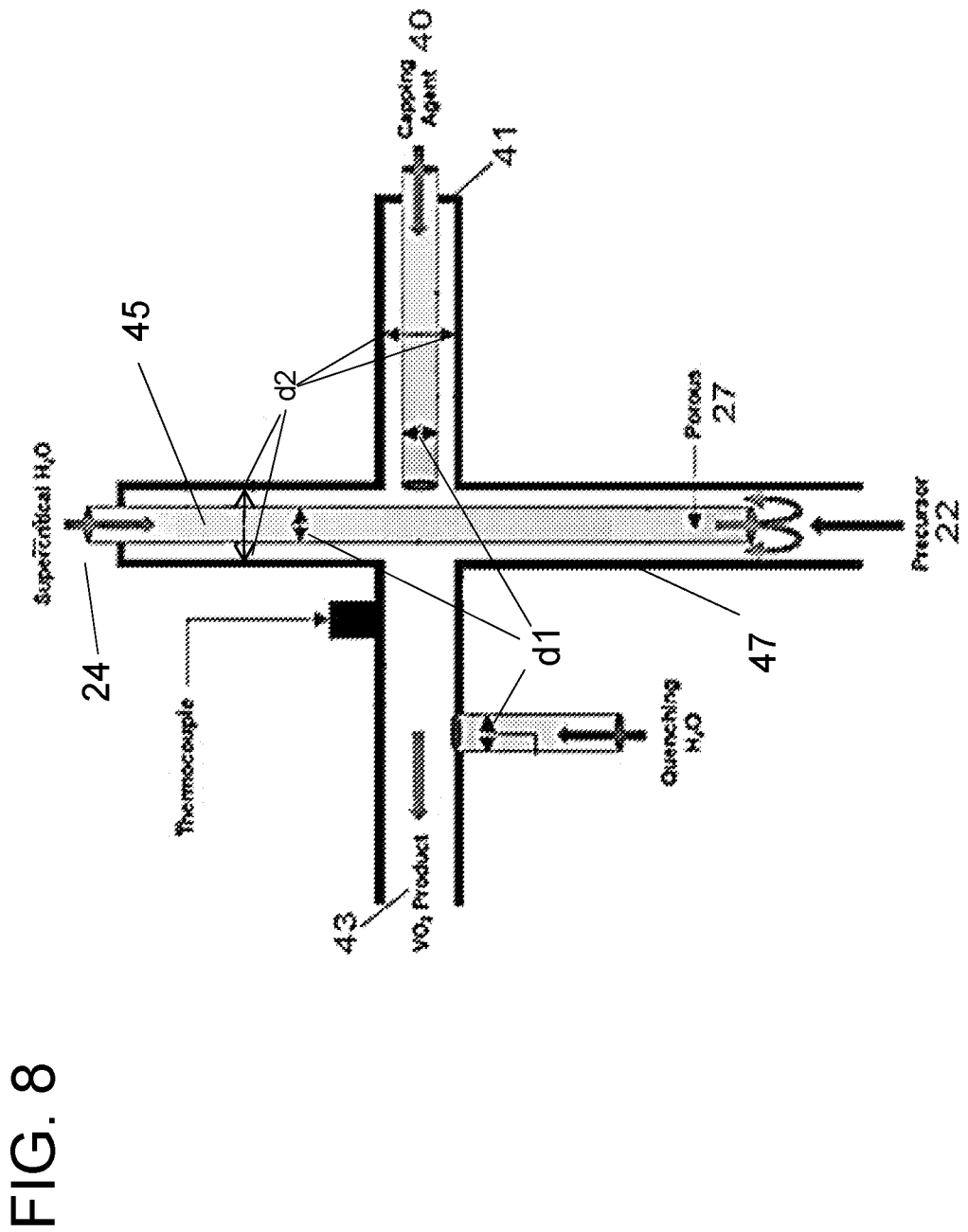
FIG. 8 is a schematic diagram of a mixing configuration, in accordance with features of the present invention.

FIG. 8 is a schematic diagram of a mixing system for use with the invention. A feature of the mixing system is maintaining the separation of precursor 22 from supercritical fluid 24. FIG. 8 shows precursor flow in direct opposition of the flow of supercritical fluid, for example, a head-on contact. Further, FIG. 8 shows the flow of capping agent in a direction generally perpendicular to the flow of the supercritical fluid and the flow of the precursor. After heat treatment, the capping agent 40 is introduced just prior to exit of composite product from the system. The diagram shows the flow of precursor and supercritical fluid opposing each other to maximize rapid commingling of the two fluids and therefore maximize heat transfer to the precursor material.

In an embodiment of the invention, heating the precursor first occurs by its mixing with the supercritical fluid in a first reaction (first heating) conduit 45 and then via contact with a second reaction conduit 47 radially displaced from and concentrically positioned with the first reaction conduit, such that the first reaction conduit 45 nests within the second reaction conduit 47. (In an embodiment of the invention, the step of heating the precursor comprises heating the precursor by the supercritical fluid at the porous outlet of the first reaction conduit and then via contact with a second reaction conduit wall radially displaced from and concentrically positioned with the first reaction conduit.

The heating water flows through the first conduit 45 defining a first reactor wall having a first diameter d1. That first tube is concentric with the second reaction conduit 47 defining a second reactor wall having a second diameter d2 at least twice as large as the diameter of the first tube. The inventors found that with a relatively small gap between the two concentric conduits, flow of colloidal fluid can be accelerated, which carries the colloidal nanoparticles generated quickly out of the high-temperature reactor region in the system to maintain the small particle size. The concomitant heating of the second reactor wall combined with initially heating the precursors with the supercritical water establishes a uniform temperature field within the system. This uniform (e.g., high temperature) field produces pure M-phase $VO_2$.

A myriad of heat transfer methods are utilized, including one or a plurality of hot water jets, such as a modified version of Lester's water jet. Instead of using a empty tubing from which hot water is ejected into the cold precursor as a jetting flow, a fluid distributor was utilized, made of porous sintered stainless steel with pore size of ~20 micrometer. This resulted in hot water being distributed more uniformly in the cold precursor to enable much more intimate contact between hot water and cold precursor (i.e. contact area between two fluids). This feature enhances heat transfer, thus leading to rapid precursor heating, which in turn results in ultra small $VO_2$ nanoparticles An embodiment of the system utilizes a sintered porous tubing (element 27 in FIG. 8) defining multiple small channels. These channels significantly increase water-precursor contact to optimize heat transfer and mixing.

The sintered porous stainless steel fluid distributer 27 is typically used in process industries to uniformly distribute either gas/or liquid in another phase. At a low pressure, the fluid can be bubbles/droplets/or small jets around the distributor. At a high pressure, it should be in a liquid form.

An exemplary mixer configuration is cross shaped with precursor and supercritical fluid flow in opposition and the sintered porous hot water flow distributor 27 disposed therebetween. Similarly, a capping agent ingress means 41 is linearly disposed with the product egress port. 43.

In summary, the invented single-step continuous flow hydrothermal systems have the ability to adjust multiple parameters including temperature and pressure instantaneously, giving it unique advantages over the conventional multi-step batch method typically used for many nanoparticle syntheses. Several parametric studies varying flow rate, precursor concentration, and composition were conducted to determine the optimal conditions to synthesize sub-50 nm $VO_2$ (M) nanoparticles, which are ideal candidates for applications in smart window films. The CFHT system manufactured $VO_2$ (M) nanoparticles with average number sizes below 50 nm with precise control. At elevated reaction temperatures up to 390° C., full conversion of the V02 nanoparticles from B- to M-phase was achieved when a total system flow rate up to 173 mL/min was used alongside a precursor concentration of 0.0119 M [$V^{4+}$], 1:4 vanadium pentoxide to oxalic acid dihydrate molar ratio. This reflected a Reynolds Number of approximately 2500, indicating transitional flow (i.e., neither laminar nor turbulent flow) and certainly too low for vortex flow.

The invented continuous flow hydrothermal systems possess not only enormous potential to manufacture nanoparticles like $VO_2$ with precise control of the desired properties, but also do so using processes that are cost-effective and more environmentally-friendly. This in turn can open new avenues for a multitude of nanomaterials to be scaled for industrial applications.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for continuously producing nanoparticles, the method comprising:
    a) heating a room temperature precursor with supercritical fluid to create a mixture, wherein the mixture contains a first compound capable of reversibly transitioning from a monoclinic to a tetragonal rutile crystal state, wherein the supercritical fluid is applied via a porous nozzle having multiple pores;
    b) maintaining a concentration of the precursor to a range of 0.01 to 1 mol/L to minimize particle growth and size to produce particles comprising solely monoclinic crystals;
    c) cooling the heated mixture to stop particle growth; and
    d) encapsulating the particles with an organic material to create a construct, wherein the organic material forms a conformal film over the particles to control light flow around the particles.

2. The method as recited in claim 1 wherein the nanoparticles are between 3 and 50 nm in diameter with a size distribution of 3 nm.

3. The method as recited in claim 1 wherein the supercritical fluid is water at more than 374° C. and supplied at a flow rate that is more than 3-times higher than a flow rate of the precursor to increase the temperature of the mixture to enable the formation of the solely monoclinic crystals.

4. The method as recited in claim 1 wherein the organic material is continuously supplied as a solute to the supercritical fluid and wherein the organic material covalently attaches to the nanoparticles at temperatures above 374° C.

5. The method as recited in claim 1 wherein the precursor defines a $V^{4+}$ solution derived from vanadium compounds and is supplied at a concentration of 0.02M or below.

6. The method as recited in claim 5 wherein the vanadium compounds are oxygen containing compounds selected from the group consisting of $V_2O_5$, $VOSO_4$, $VOCl_2$, and combinations thereof.

7. The method as recited in claim 1 wherein the encapsulating step generates a colloid effluent to functionalize the construct and simultaneously separate the construct from the colloid effluent.

8. The method as recited in claim 1 wherein the organic material is a compound selected from the group consisting of carboxylic acids, amines, polymers, polyols, and combinations thereof.

9. The method as recited in claim 1 further comprising heating the particles to between 300° C. and 500° C. to provide a uniform temperature field to prevent the generation of low-temperature phase $VO_2$ or mixed phase $VO_2$ nanoparticle materials.

10. The method as recited in claim 1 wherein the particles are produced at temperatures higher than about 240° C. but below about 450° C., at pressures below about 240 bar, and a resident time within about 2 minutes.

11. The method as recited in claim 1 wherein the step of heating the precursor comprises heating the precursor by the supercritical fluid in a first reaction conduit and then via contact with a second reaction conduit radially displaced from and concentrically positioned with the first reaction conduit, wherein the encapsulation occurs along the length of the first reaction conduit.

12. The method as recited in claim 1 wherein the nozzle has pores all of about 20 micrometers.

13. A method for continuously producing nanoparticles, the method comprising:
 a) heating a room temperature precursor with supercritical fluid wherein the mixture contains a first compound capable of reversibly transitioning from a monoclinic to a tetragonal rutile crystal state, wherein the supercritical fluid is applied via a porous nozzle;
 b) varying concentration of the precursor to a range of 0.01 to 1 mol/L to minimize particle growth and size to produce particles comprising solely monoclinic crystals;
 c) cooling the heated mixture to stop particle growth; and
 d) encapsulating the particles with an organic material to create a construct, wherein the organic material forms a conformal film over the particles to control light flow around the particles,
 wherein the supercritical fluid is applied at a first flow rate which is three times higher than a second flow rate of the precursor.

14. The method as recited in claim 11 wherein precursor flows in opposition to the flow of the supercritical fluid and perpendicular to the flow of the supercritical fluid.

15. The method as recited in claim 1 wherein the concentration of precursor is 0.01 mol/L.

* * * * *